United States Patent
Mittal et al.

(10) Patent No.: US 11,862,769 B2
(45) Date of Patent: Jan. 2, 2024

(54) BATTERY SEPARATORS FOR E-RICKSHAW AND SIMILAR VEHICLE LEAD ACID BATTERIES

(71) Applicant: Daramic, LLC, Charlotte, NC (US)

(72) Inventors: Surendra Kumar Mittal, Bangalore (IN); Naveen Prabhu Shanmugam, Bangalore (IN)

(73) Assignee: Daramic, LLC, Charlotte, NC (US)

( * ) Notice: Subject to any disclaimer, the term of this patent is extended or adjusted under 35 U.S.C. 154(b) by 0 days.

(21) Appl. No.: 15/403,700

(22) Filed: Jan. 11, 2017

(65) Prior Publication Data
US 2017/0200984 A1 Jul. 13, 2017

Related U.S. Application Data

(63) Continuation of application No. PCT/US2016/012826, filed on Jan. 11, 2016.

(51) Int. Cl.
*H01M 10/42* (2006.01)
*H01M 50/44* (2021.01)
(Continued)

(52) U.S. Cl.
CPC ....... *H01M 10/4235* (2013.01); *H01M 10/06* (2013.01); *H01M 50/417* (2021.01);
(Continued)

(58) Field of Classification Search
CPC ........... H01M 10/4235; H01M 2/1613; H01M 2/1653; H01M 2/1666; H01M 2/18;
(Continued)

(56) References Cited

U.S. PATENT DOCUMENTS

| 2003/0054234 A1* | 3/2003 | Zucker | H01M 50/491 |
| | | | 429/252 |
| 2008/0118827 A1* | 5/2008 | Call | H01M 2/1653 |
| | | | 429/129 |

(Continued)

FOREIGN PATENT DOCUMENTS

| WO | WO-0072389 A1 * | 11/2000 | ............ H01M 2/145 |
| WO | WO2013192513 | 12/2013 | |

*Primary Examiner* — Stewart A Fraser
(74) *Attorney, Agent, or Firm* — Hammer & Associates, P.C.

(57) ABSTRACT

Disclosed herein are novel or improved separators, battery separators, lead battery separators, batteries, cells, and/or methods of manufacture and/or use of such separators, battery separators, lead battery separators, cells, and/or batteries. In accordance with at least certain embodiments, the present disclosure or invention is directed to novel or improved battery separators for lead acid batteries. In addition, disclosed herein are methods, systems and battery separators for enhancing battery life, reducing active material shedding, reducing grid and spine corrosion, reducing failure rate reducing acid stratification and/or improving uniformity in at least lead acid batteries, in particular batteries for electric rickshaws. In accordance with at least particular embodiments, the present disclosure or invention is directed to an improved separator for lead acid batteries wherein the separator includes improved membrane profiles, improved coatings, improved configurations, and/or the like.

19 Claims, 20 Drawing Sheets

(51) Int. Cl.
*H01M 10/06* (2006.01)
*H01M 50/417* (2021.01)
*H01M 50/489* (2021.01)
*H01M 50/437* (2021.01)
*H01M 50/454* (2021.01)

(52) U.S. Cl.
CPC ......... *H01M 50/437* (2021.01); *H01M 50/44* (2021.01); *H01M 50/454* (2021.01); *H01M 50/489* (2021.01); *H01M 2220/20* (2013.01); *Y02E 60/10* (2013.01); *Y02P 70/50* (2015.11)

(58) Field of Classification Search
CPC .. H01M 10/06; H01M 50/489; H01M 50/437; H01M 50/454; H01M 50/417; H01M 50/44
See application file for complete search history.

(56) References Cited

U.S. PATENT DOCUMENTS

| | | | |
|---|---|---|---|
| 2009/0030100 A1* | 1/2009 | Nagamatsu | C01B 25/32 521/142 |
| 2011/0091761 A1 | 4/2011 | Miller et al. | |
| 2012/0070747 A1* | 3/2012 | Whear | H01M 10/06 429/247 |
| 2013/0162203 A1* | 6/2013 | Kamata | H02J 7/025 320/108 |
| 2014/0255775 A1 | 9/2014 | Jagannathan et al. | |
| 2015/0093625 A1* | 4/2015 | Hirano | H01M 50/4295 429/144 |

* cited by examiner

BATTERY SEPARATORS FOR E-RICKSHAW AND SIMILAR VEHICLE LEAD ACID BATTERIES

CROSS-REFERENCE TO RELATED APPLICATION

This patent application claims priority to and the benefit of International Application Number PCT/US2016/012826, filed Jan. 11, 2016.

FIELD

In accordance with at least selected embodiments, the present disclosure or invention is directed to separators, particularly separators for lead acid batteries, more particularly battery separators for E-rickshaw or similar vehicle lead acid batteries. In accordance with at least selected embodiments, the present disclosure or invention is directed to novel or improved separators, battery separators, batteries, cells, and/or methods of manufacture and/or use of such separators, battery separators, cells, and/or batteries for electric rickshaws. In accordance with at least certain embodiments, the present disclosure or invention is directed to an improved separator for lead acid batteries and/or improved methods of using such batteries having such improved separators, especially in the context of electric rickshaws. In addition, disclosed herein are methods, systems and battery separators for enhancing battery life, reducing battery failure, reducing active material shedding, reducing positive grid and spine corrosion, reducing water loss, increasing wettability, reducing acid stratification, improving acid diffusion, and/or improving uniformity in lead acid batteries, especially for electric rickshaw batteries. In accordance with at least particular embodiments, the present disclosure or invention is directed to an improved separator for lead acid batteries wherein the separator includes improved rib profiles, improved coatings, improved envelope and sleeve configurations, improved performance, and/or the like.

BACKGROUND

Electric rickshaws (E-rickshaws or e-rickshaws) and similar vehicles, are commonly employed in many Asian countries like China, India and Bangladesh to transport passengers and cargo over short distances. E-rickshaws have electric drive motors (rather than gasoline engines) and are typically powered by a series of 12V lead acid batteries, commonly four batteries or more arranged in series. The failure rate of batteries in an e-rickshaw is often higher than for batteries used in other vehicles or contexts. There are multiple factors which contribute to e-rickshaw battery failure. For instance, certain low end electric rickshaws may be designed and manufactured to a price point that sacrifices quality for cost. By way of example only, low quality battery chargers can overcharge the battery which increases corrosion of the plate grid and spine. Inferior AC/DC converters and voltage loss from poor wiring may also increase the load on the battery. Travel over poorly maintained roads subjects the e-rickshaw battery to increased vibration and shock, leading to loosening of battery components and dislodging active material from the grids. E-rickshaw operators (who may not be familiar with best practices of lead acid battery operation) seeking to maximize their own productivity may expend up to 90% of the total charge (i.e., a deep discharge). Such deep discharge/recharge cycling places additional stress on the battery system. As a consequence of the foregoing factors and more, it is estimated that warranty claims for e-rickshaw batteries can exceed 10-15%.

There is a need for improved batteries for e-rickshaws that solve the aforementioned problems without substantially increasing the cost of the product. There is a need for new or improved battery separators and/or battery technologies to meet and overcome the challenges arising from e-rickshaw lead-acid battery needs, especially to reduce battery failure, active material shedding and corrosion.

SUMMARY

In accordance with at least selected embodiments, the present disclosure or invention may address the above issues or needs. In accordance with at least certain embodiments, the present disclosure or invention may provide an improved battery separator and/or battery which overcomes the aforementioned problems, for instance by enhancing battery life, reducing battery failure, reducing active material shedding, reducing grid and spine corrosion, reducing water loss, increasing wettability, reducing acid stratification, improving acid diffusion, and/or improving uniformity in the e-rickshaw lead acid batteries.

In accordance with at least certain embodiments, the present disclosure or invention is directed to an improved separator for lead acid batteries and/or improved methods of using such batteries having such improved separators. In accordance with at least selected embodiments, the present disclosure or invention may address the above issues or needs and/or may provide novel or improved lead acid batteries. In accordance with at least selected embodiments, the present disclosure or invention is directed to novel or improved separators, battery separators, lead acid battery separators, batteries, cells, and/or methods of manufacture and/or use of such separators, battery separators, lead acid battery separators, cells, and/or batteries. In accordance with at least certain embodiments, the present disclosure or invention is directed to novel or improved lead acid battery separators for e-rickshaw applications, and/or improved methods of making and/or using such improved separators, cells, batteries, systems, and/or the like. In addition, disclosed herein are methods, systems and battery separators for enhancing battery life, reducing battery failure, reducing active material shedding, reducing positive grid corrosion, reducing water loss, increasing wettability, reducing acid stratification, improving acid diffusion, and/or improving uniformity in lead acid batteries. In accordance with at least particular embodiments, the present disclosure or invention is directed to an improved separator for lead acid batteries wherein the separator includes improved membrane profiles, improved coatings, improved configurations, and/or the like.

In accordance with at least certain selected embodiments, a microporous separator exhibiting reduced active material shedding, for instance positive active material shedding, is provided. Because the separator may be in direct contact with the electrode, it immobilizes any dislodged materials from dispersing into the electrolyte.

In accordance with at least certain selected embodiments, a microporous separator with improved coatings and/or additives leading to reduced grid corrosion is provided.

In accordance with at least certain selected embodiments, the improved separator may include an improved porous membrane. The improved porous membrane can include ribs profiles and/or fibrous layers intended to reduce shorts and failures caused by active material shedding and/or grid corrosion. Provided herein are battery separators in the form of a sleeve, tube, envelope, pocket, hybrid envelope/pocket and/or the like. The improved shapes reduce shorts and failures due to active material shedding, while facilitating the circulation of electrolyte within the cell.

The separator may contain one or more performance enhancing additives, such as a surfactant, along with other additives or agents, residual oil, and fillers. Such performance enhancing additives can further reduce separator oxidation, reduce water loss, and/or facilitate the transport of ions across the membrane.

In certain selected embodiments, a separator having an improved porous membrane is provided with improved rib, negative rib and backweb profile. The porous membrane may further include one or more performance enhancing coatings and/or fibrous layers. The separator may be in the form of a sleeve, envelope, pocket or hybrid envelope/pocket, and the like.

BRIEF DESCRIPTION OF THE DRAWINGS

FIGS. 11 and 13 show the water loss of each sample of an exemplary separator as compared to each sample of a control separator during the first 50 cycles of testing. FIGS. 12 and 14 show the end of charge current of each sample of an exemplary separator as compared to each sample of a control separator during the first 50 cycles of testing.

FIGS. 15 and 17 show the water loss of each sample of an exemplary separator as compared to each sample of a control separator during the first 25 cycles of testing. FIGS. 16 and 18 show the end of charge current of each sample of an exemplary separator as compared to each sample of a control separator during the first 25 cycles of testing.

DETAILED DESCRIPTION

Figure 1:
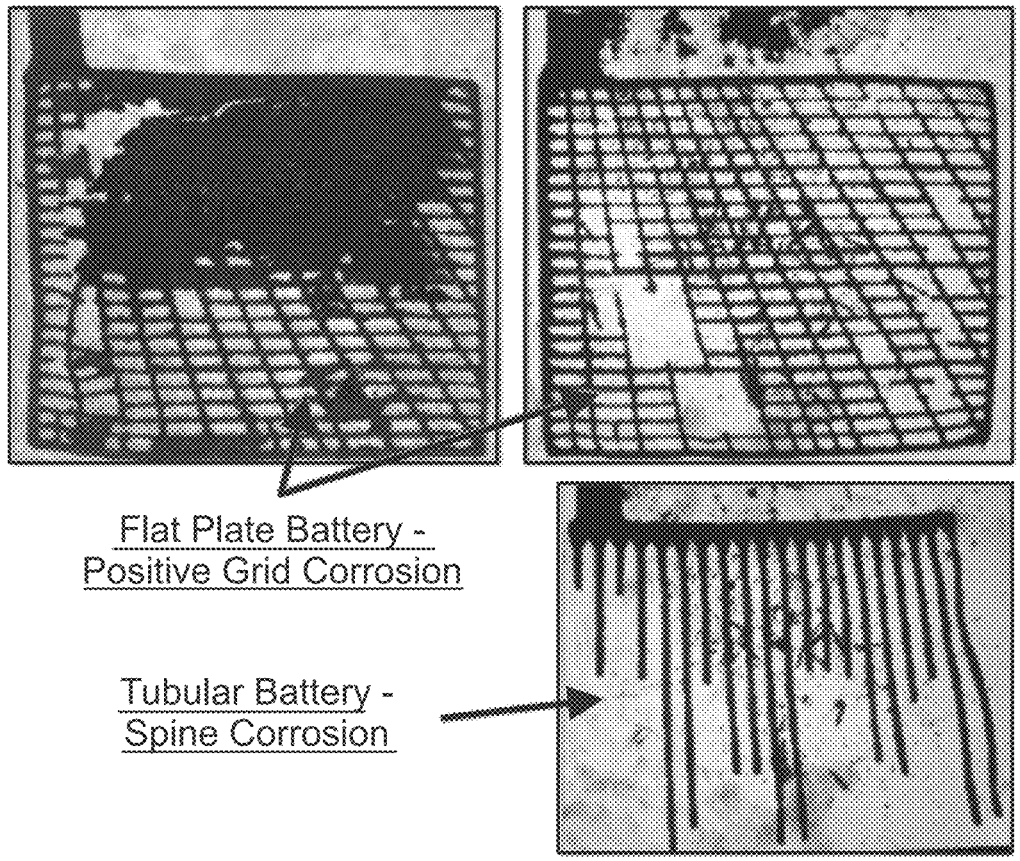
FIG. 1 includes a depiction of corroded grids from lead acid batteries.
Figure 2:
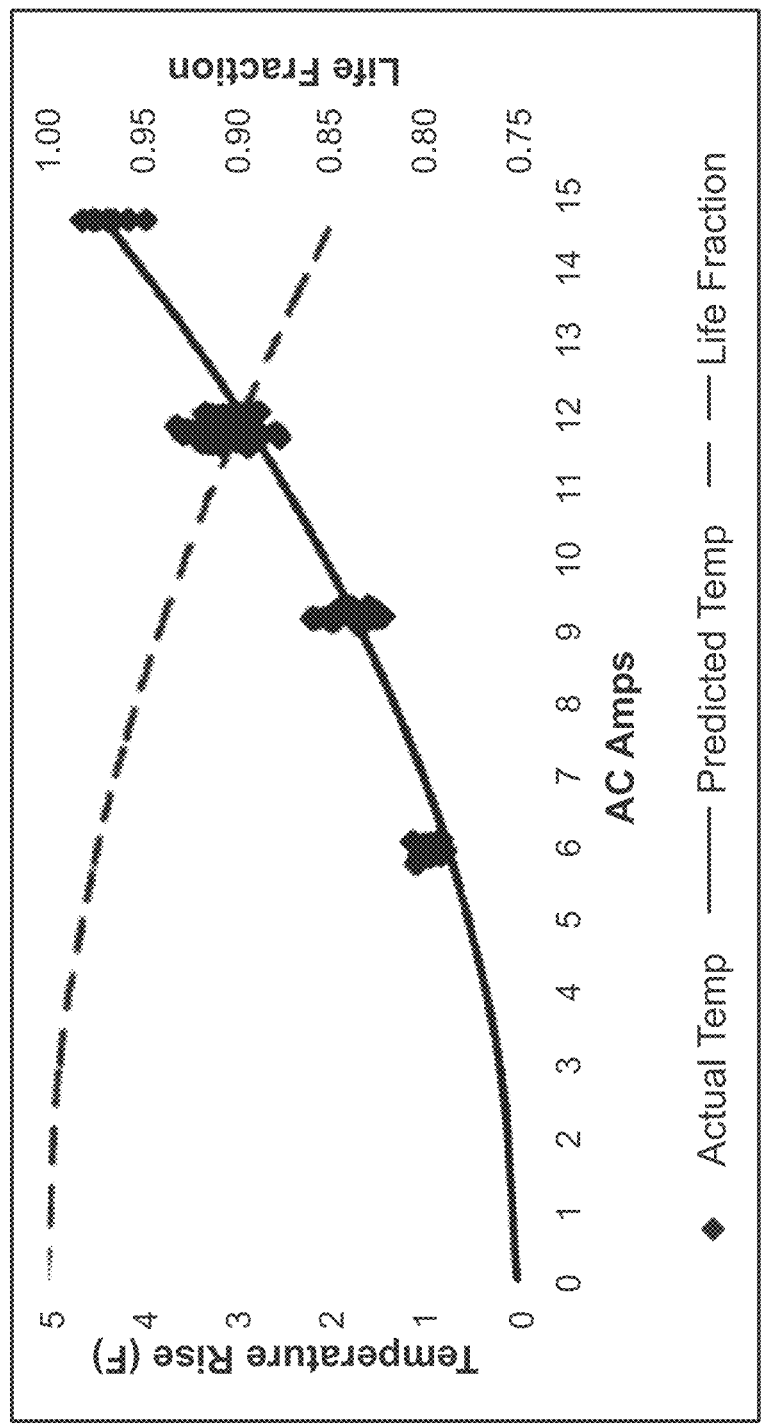
FIG. 2 includes a depiction of the effect of AC ripple current on battery life.
Figure 3:
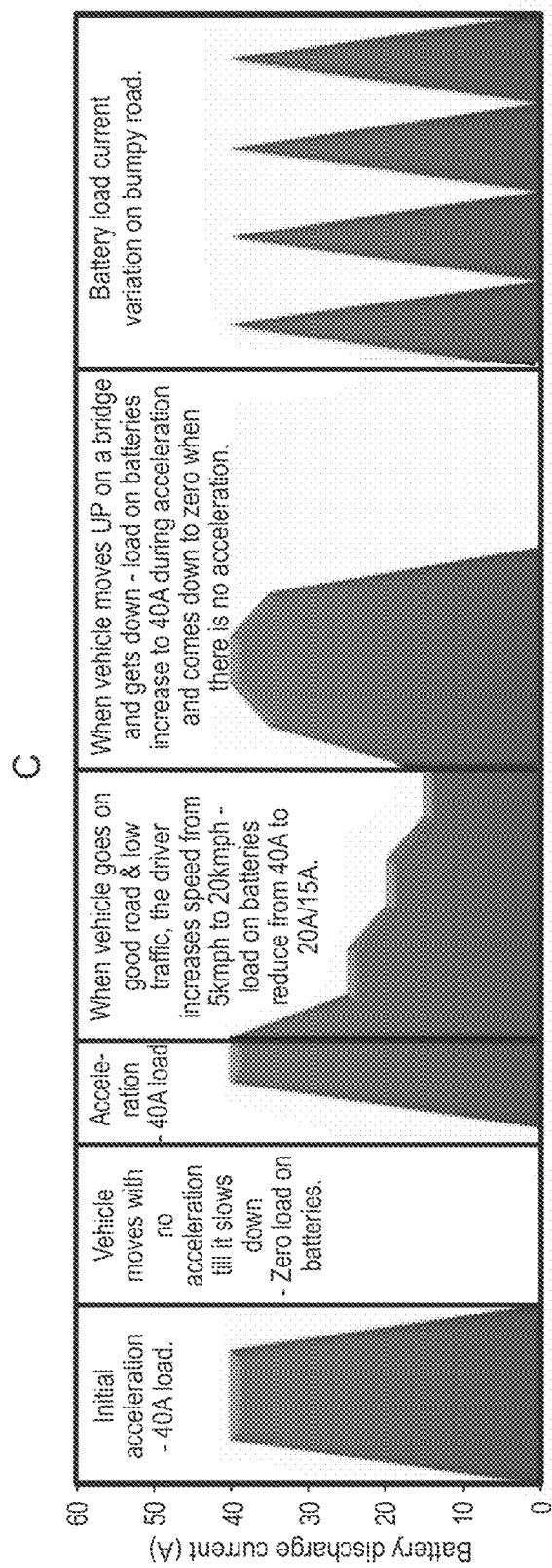
FIG. 3 includes a depiction of battery strain during various phases of e-rickshaw operation.
Figure 4:
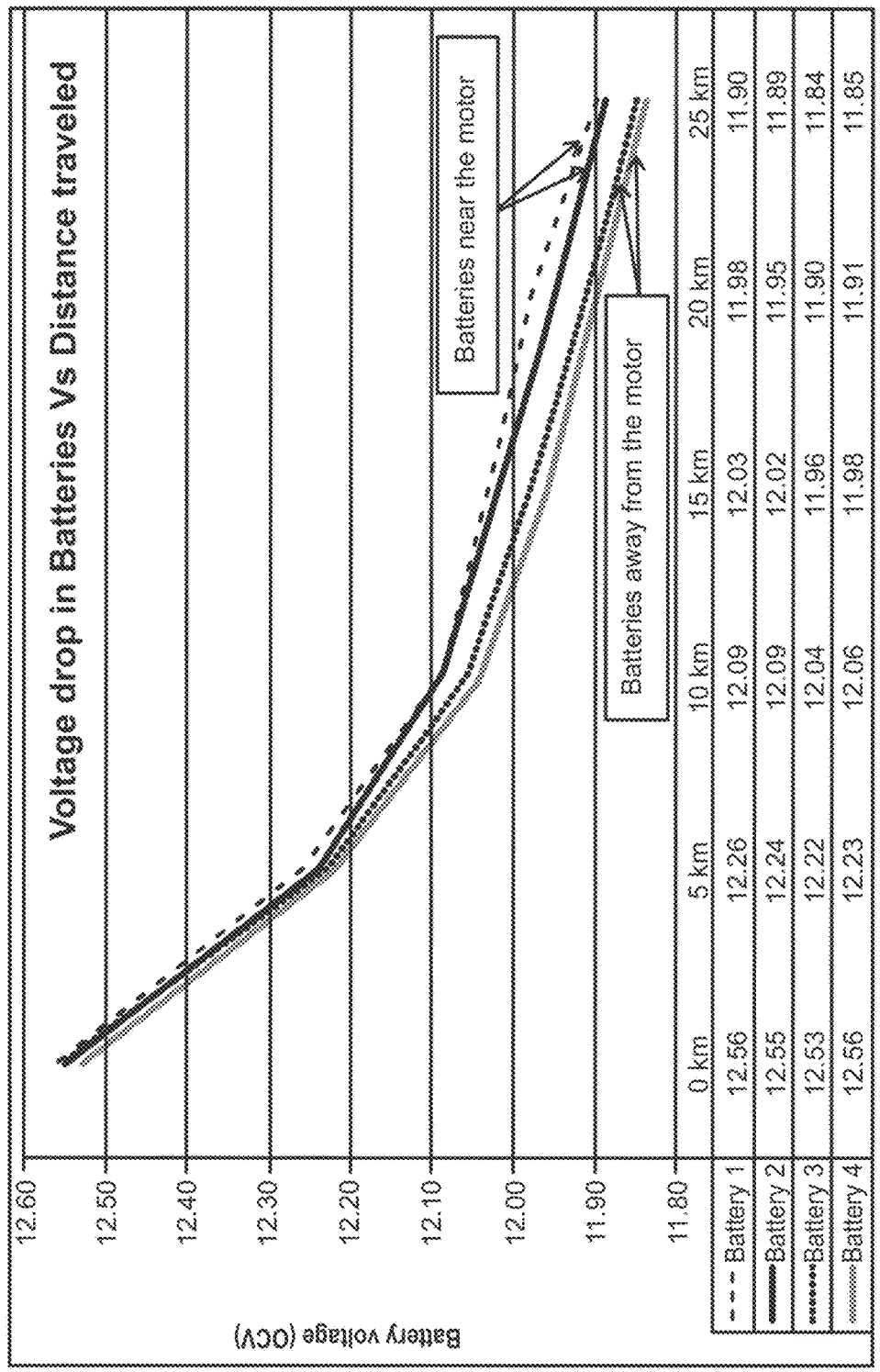
FIG. 4 includes a depiction of voltage variation as a consequence of electric wiring.
Figure 5:
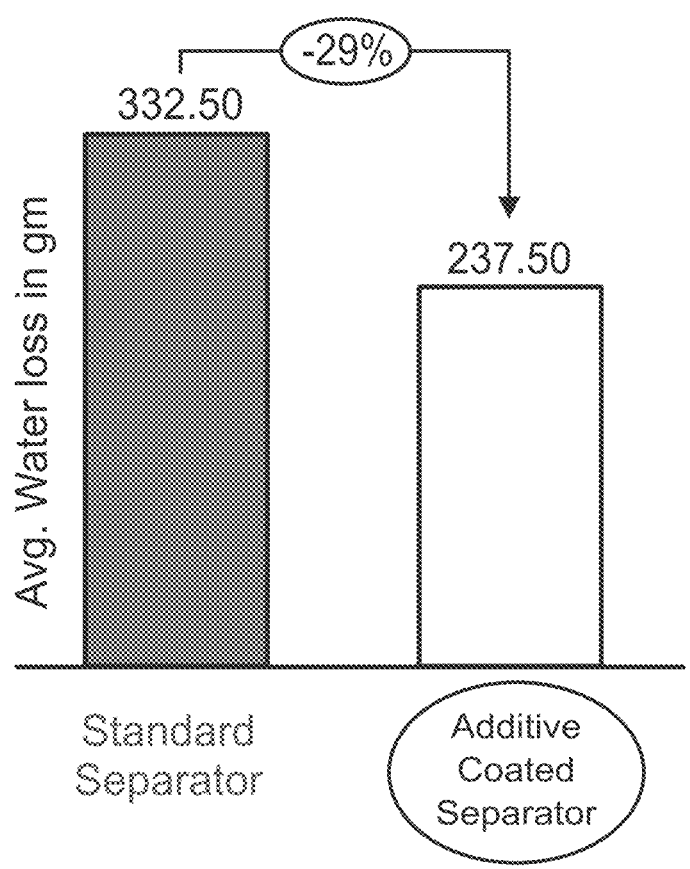
FIG. 5 includes a comparison of water loss in batteries equipped with a standard separator, and batteries equipped with an additive coated separator.
Figure 6:
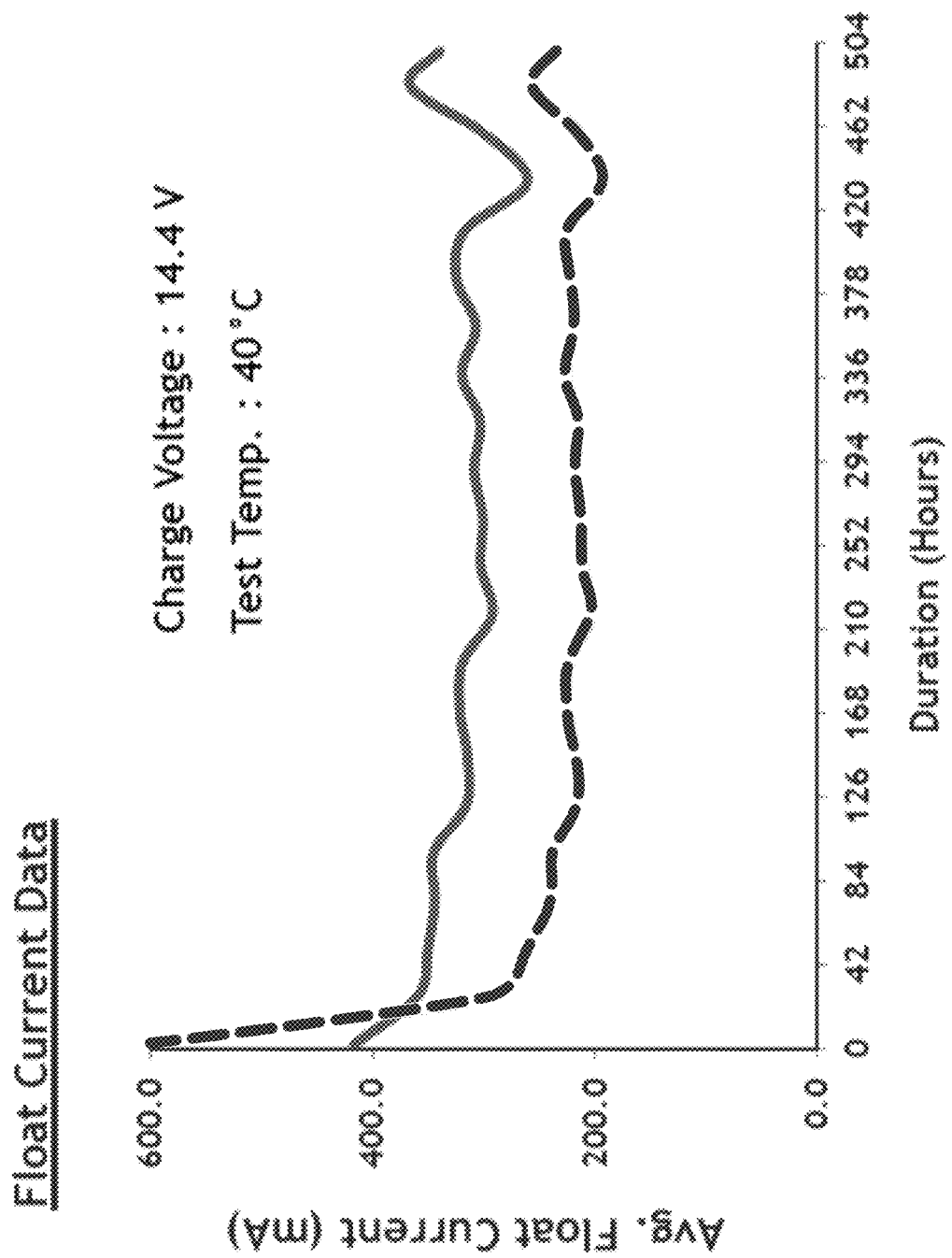
FIG. 6 includes a comparison of float current in batteries equipped with a standard separator (solid-top trace), and batteries equipped with an additive coated separator (dashed-bottom trace).
Figure 7:
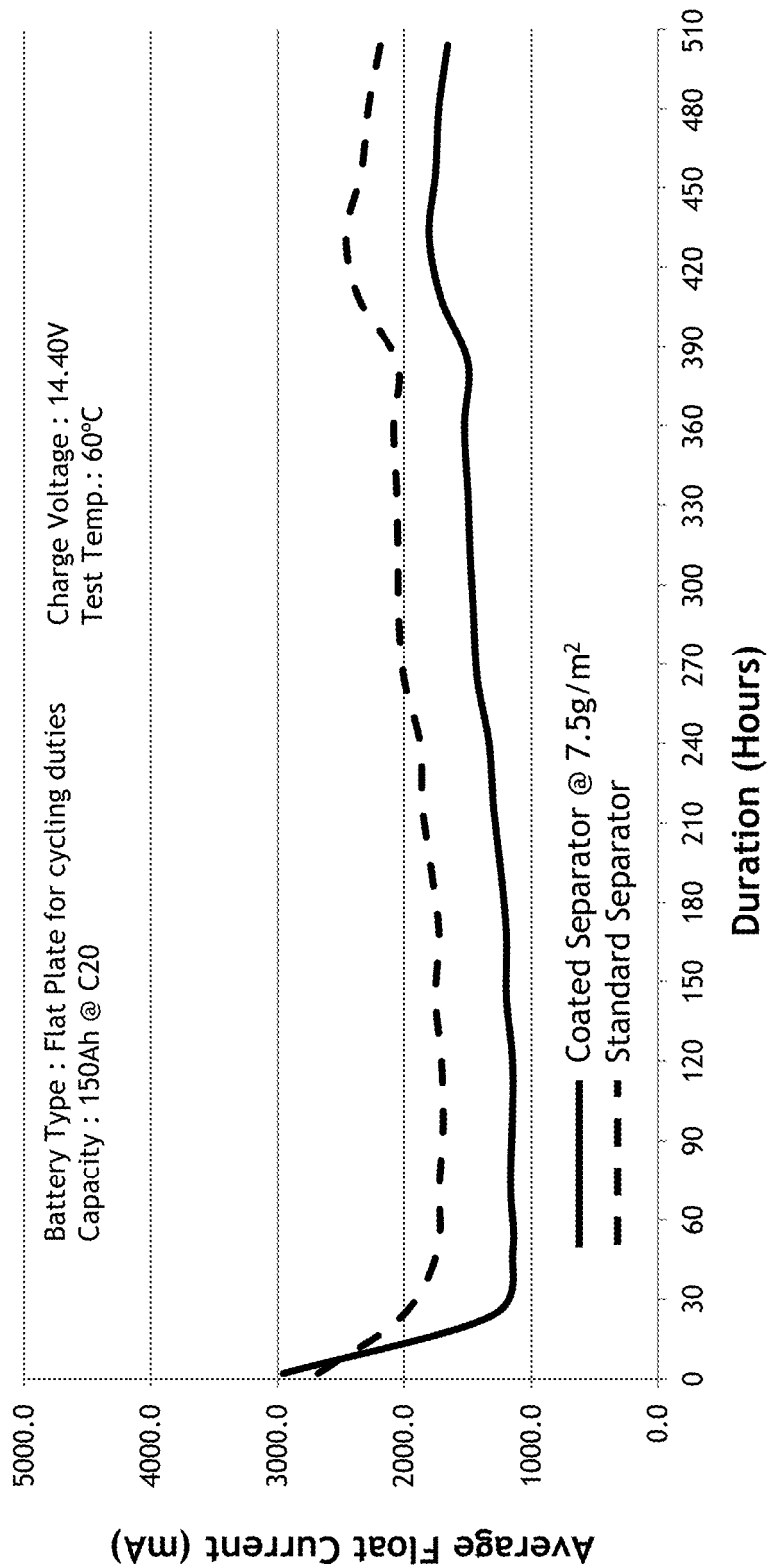
FIGS. 7, 8, and 9 illustrate the equilibrium float current for the first, second, and third 21 day test cycles, respectively, in batteries equipped with standard separators and batteries equipped with additive coated separators with a coating density of 7.5 g/m². Such testing reflects water loss data for the batteries using the various separators.
Figure 8:
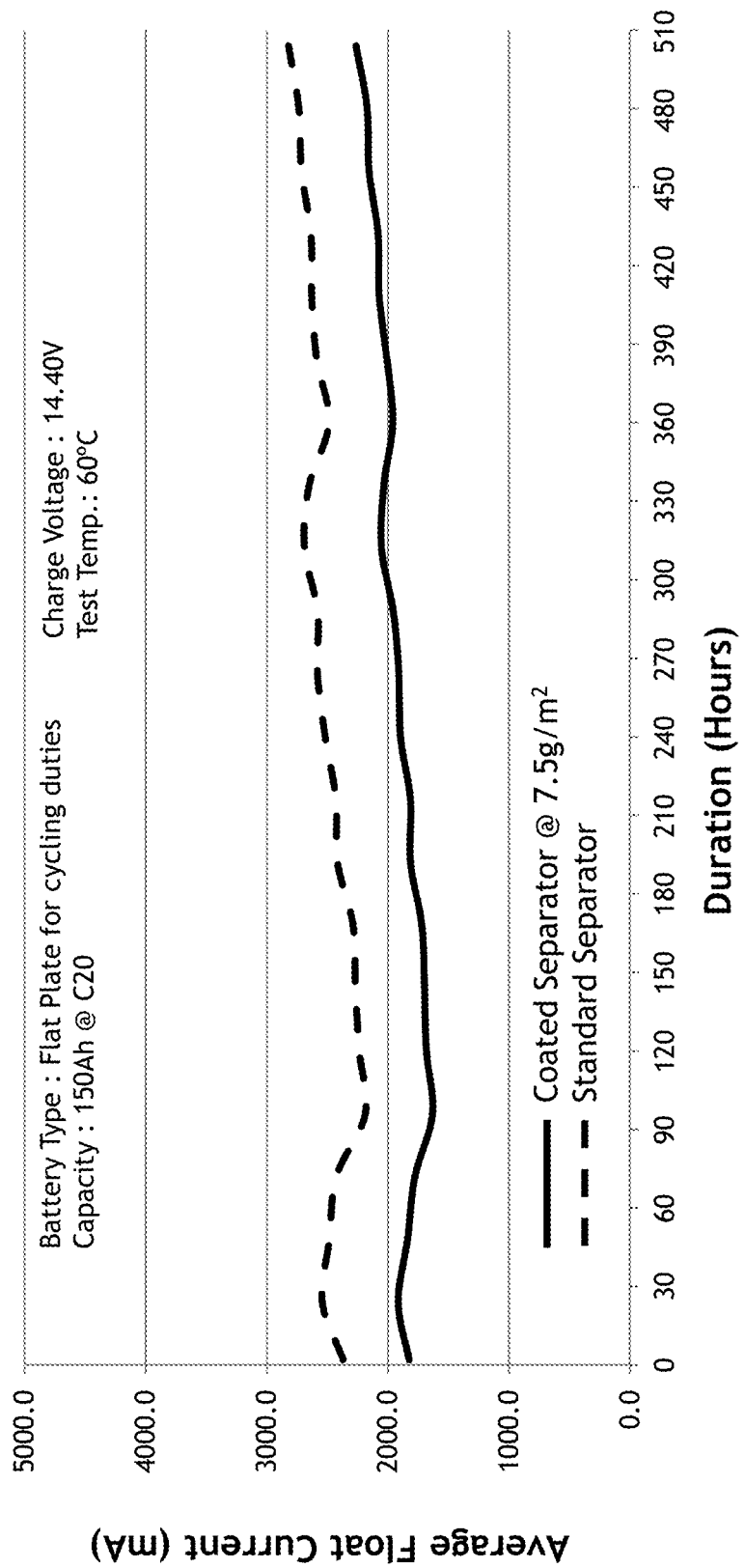
Figure 9:
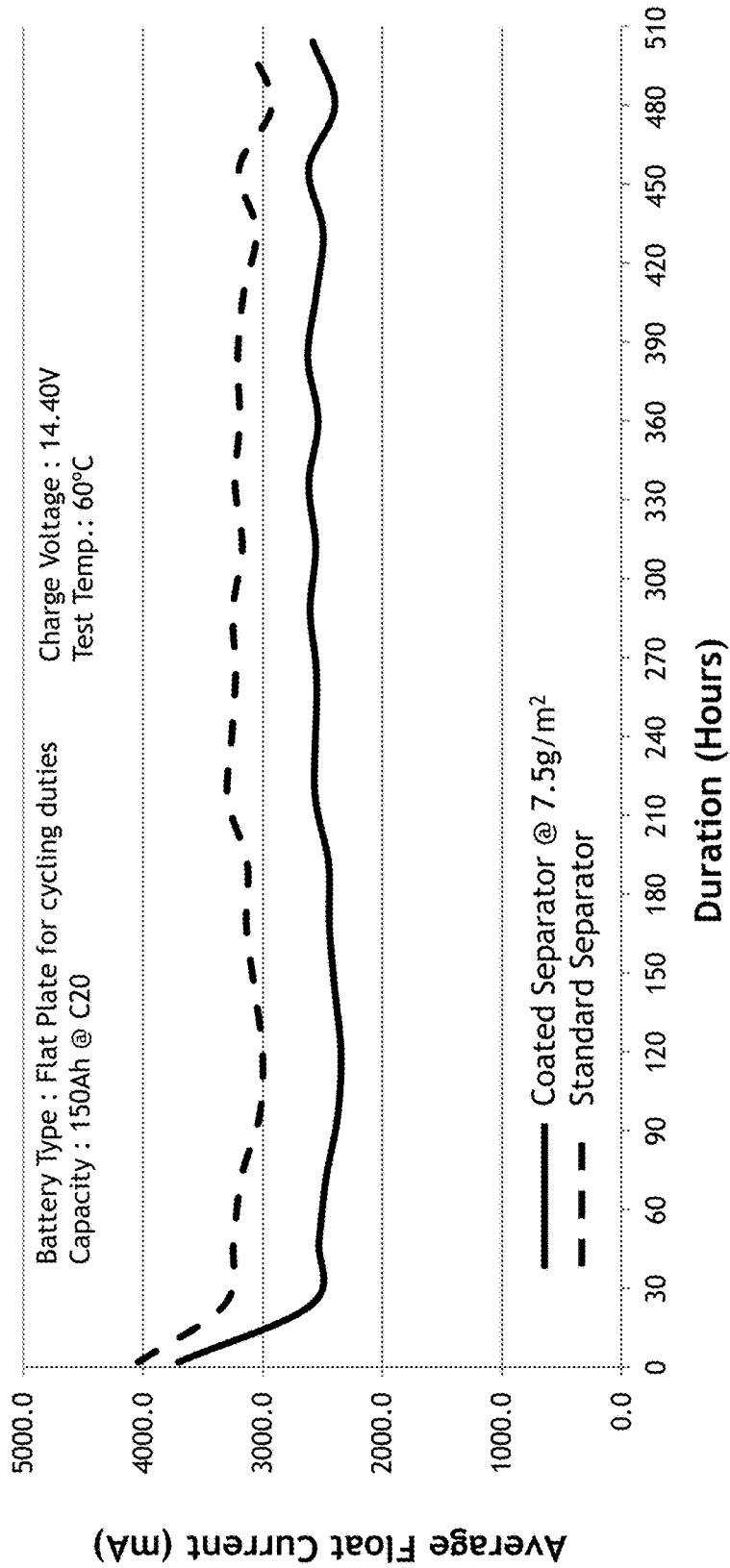
Figure 10:
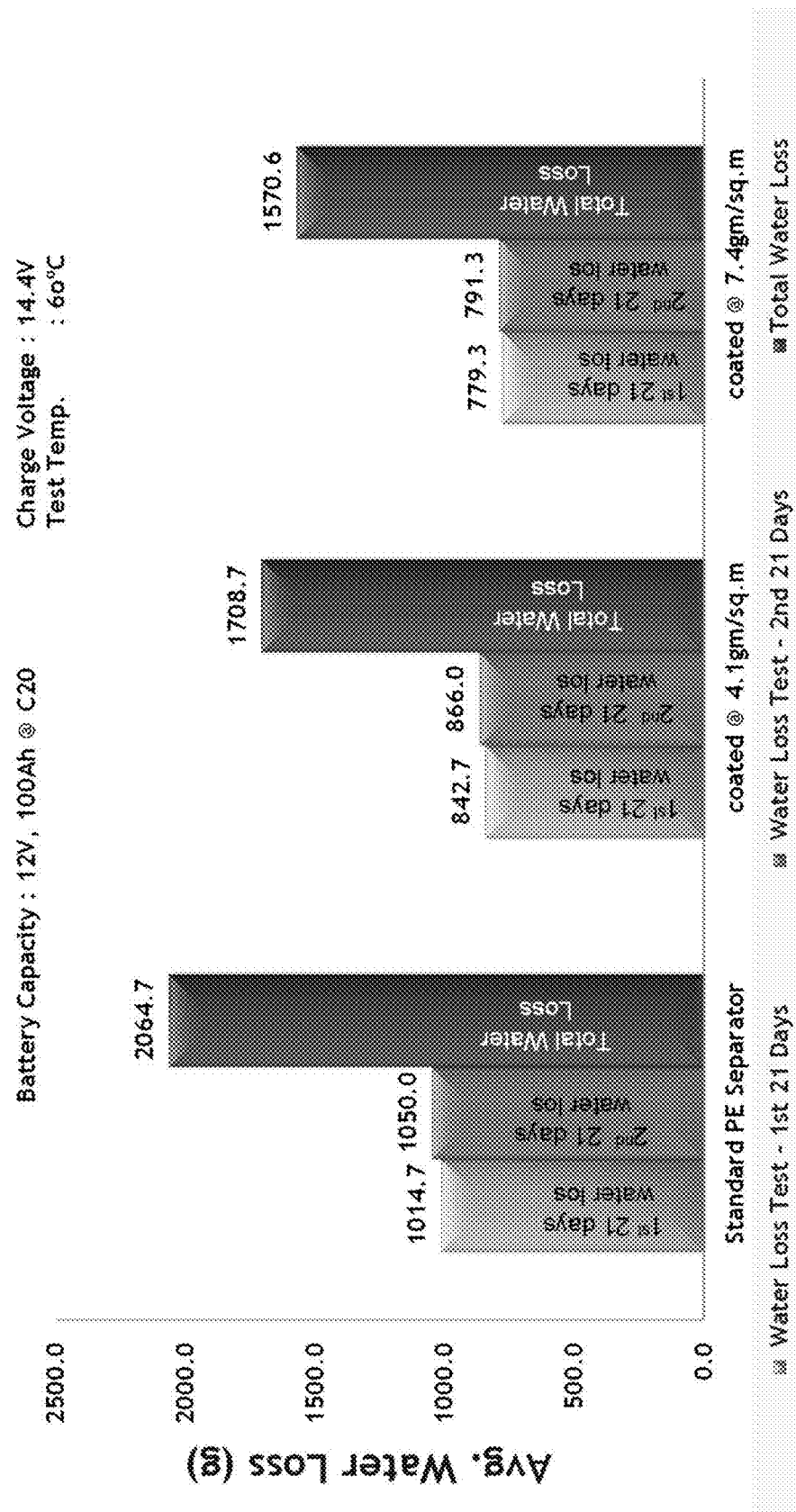
FIG. 10 shows the battery water loss over certain test cycles (first 21 days, second 21 days) for batteries, all with high antimony content, with standard separators, batteries with coated separators with a coating density of 4.1 g/m², and batteries with coated separators with a coating density of 7.4 g/m². As can be seen, the standard separator batteries experienced the most water loss, followed by the separators with a coating density of 4.1 g/m² separators, and finally the batteries with the coating density of 7.4 g/m² separators experienced the least water loss.
Figure 11:
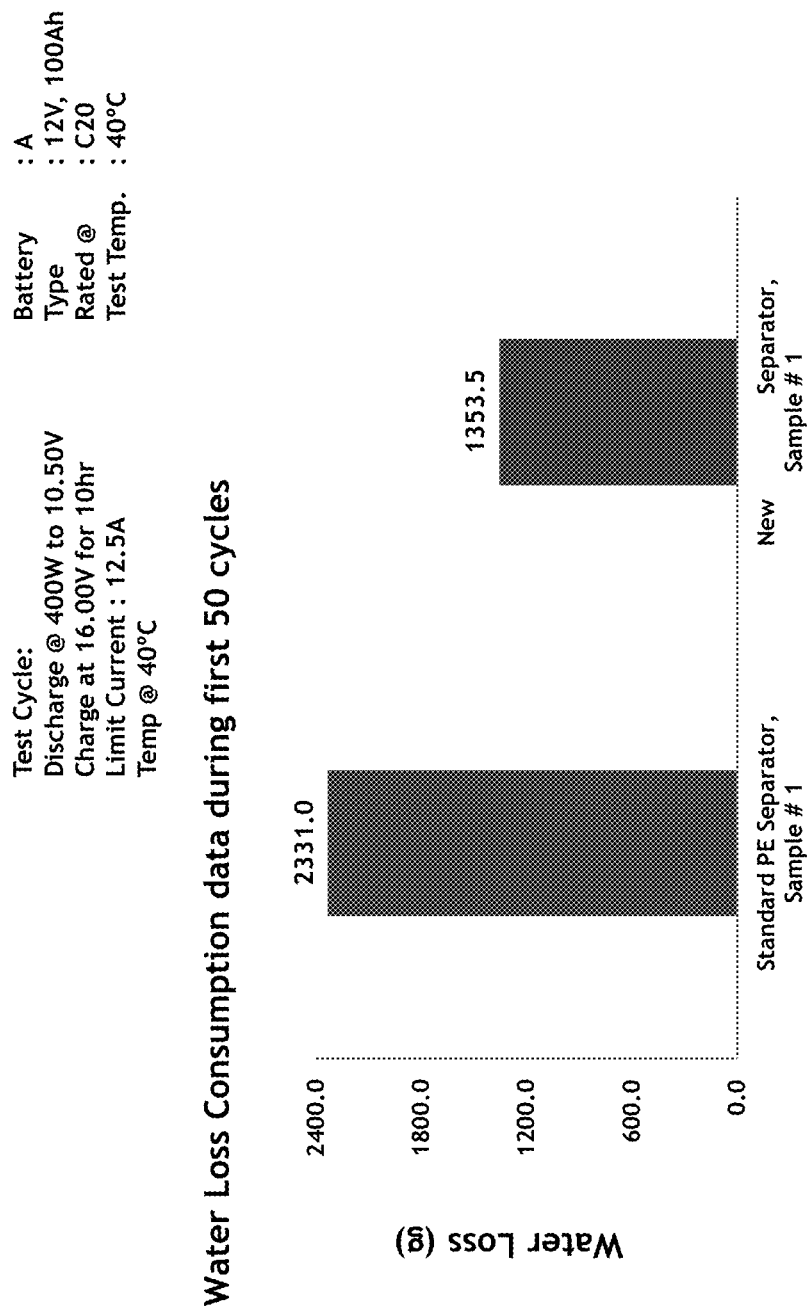
FIGS. 11-14 depict test results for a first set of exemplary batteries equipped with two samples of a control separator and two samples of an exemplary separator as shown and described herein.
Figure 12:
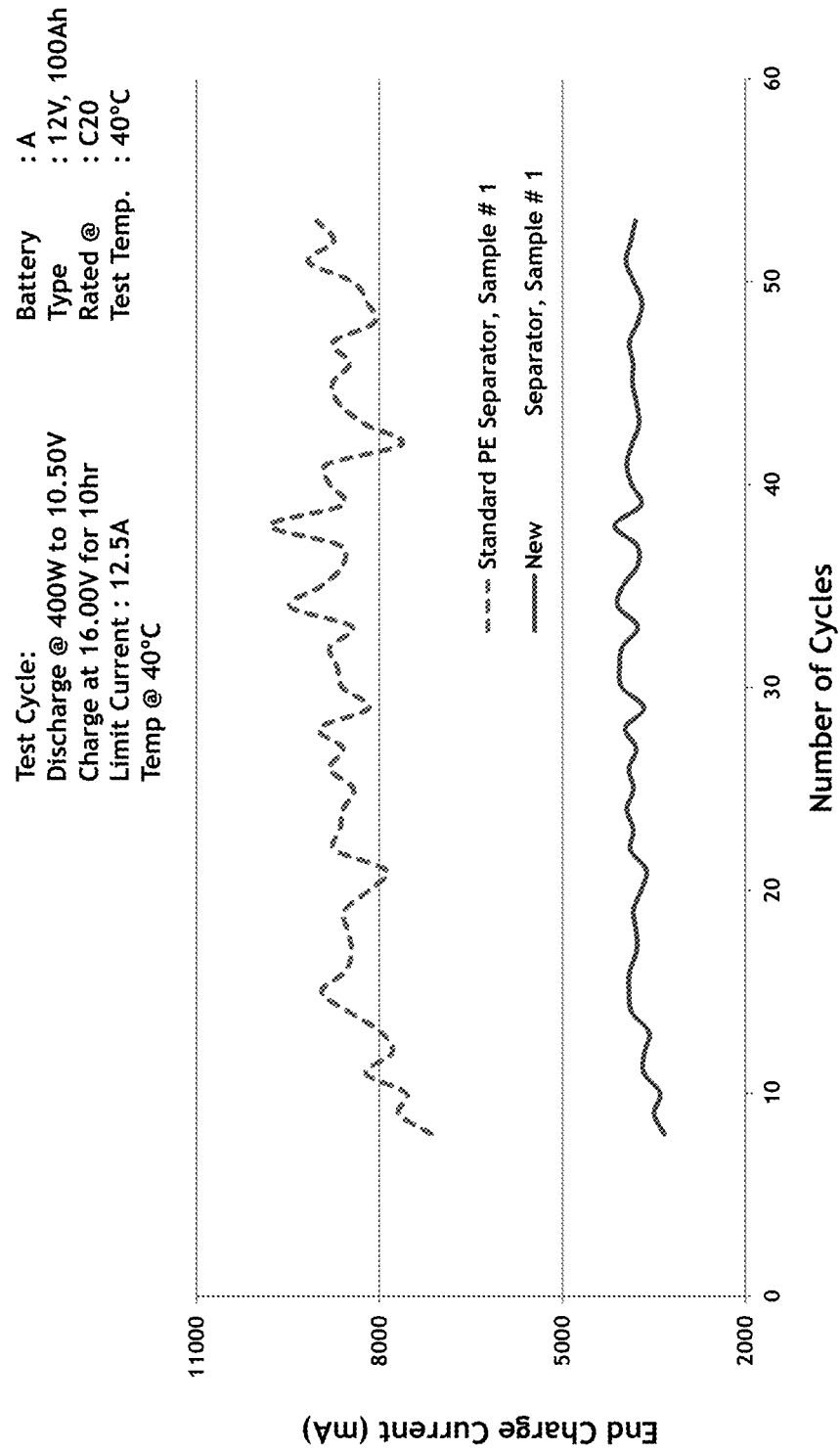
Figure 13:
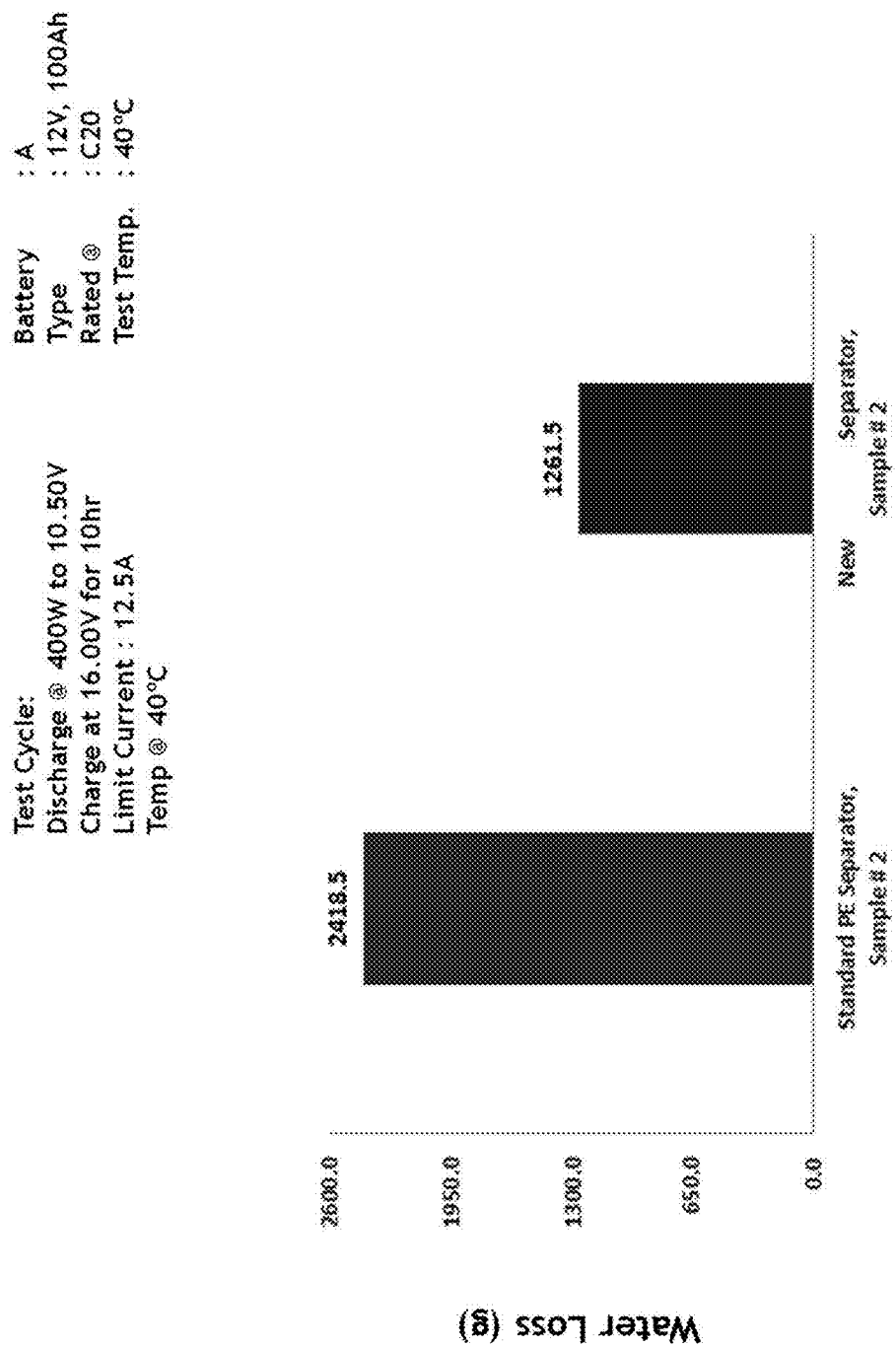
Figure 14:
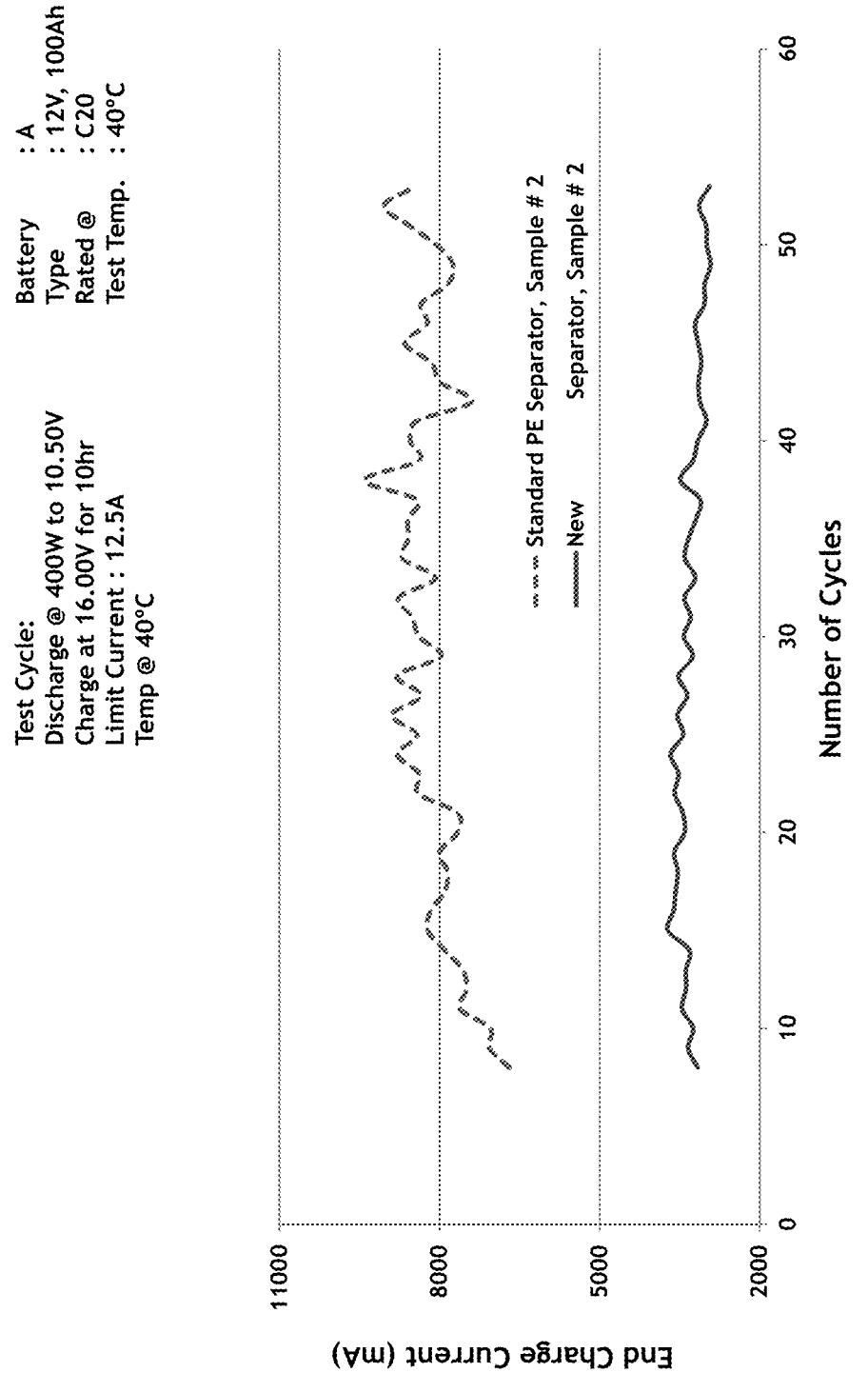
Figure 15:
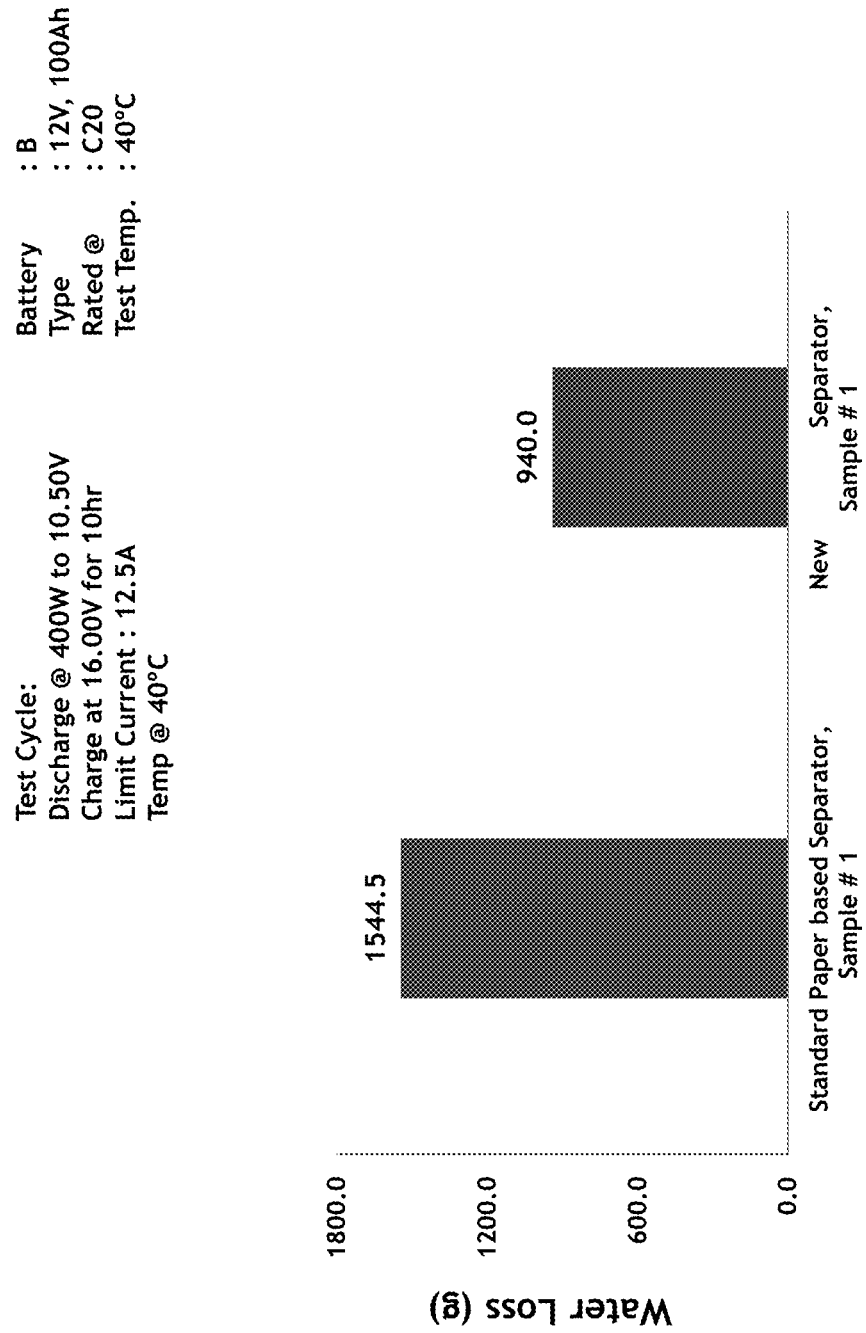
FIGS. 15-18 depict test results for a second set of exemplary batteries equipped with two samples of a control separator and two samples of an exemplary separator as shown and described herein.
Figure 16:
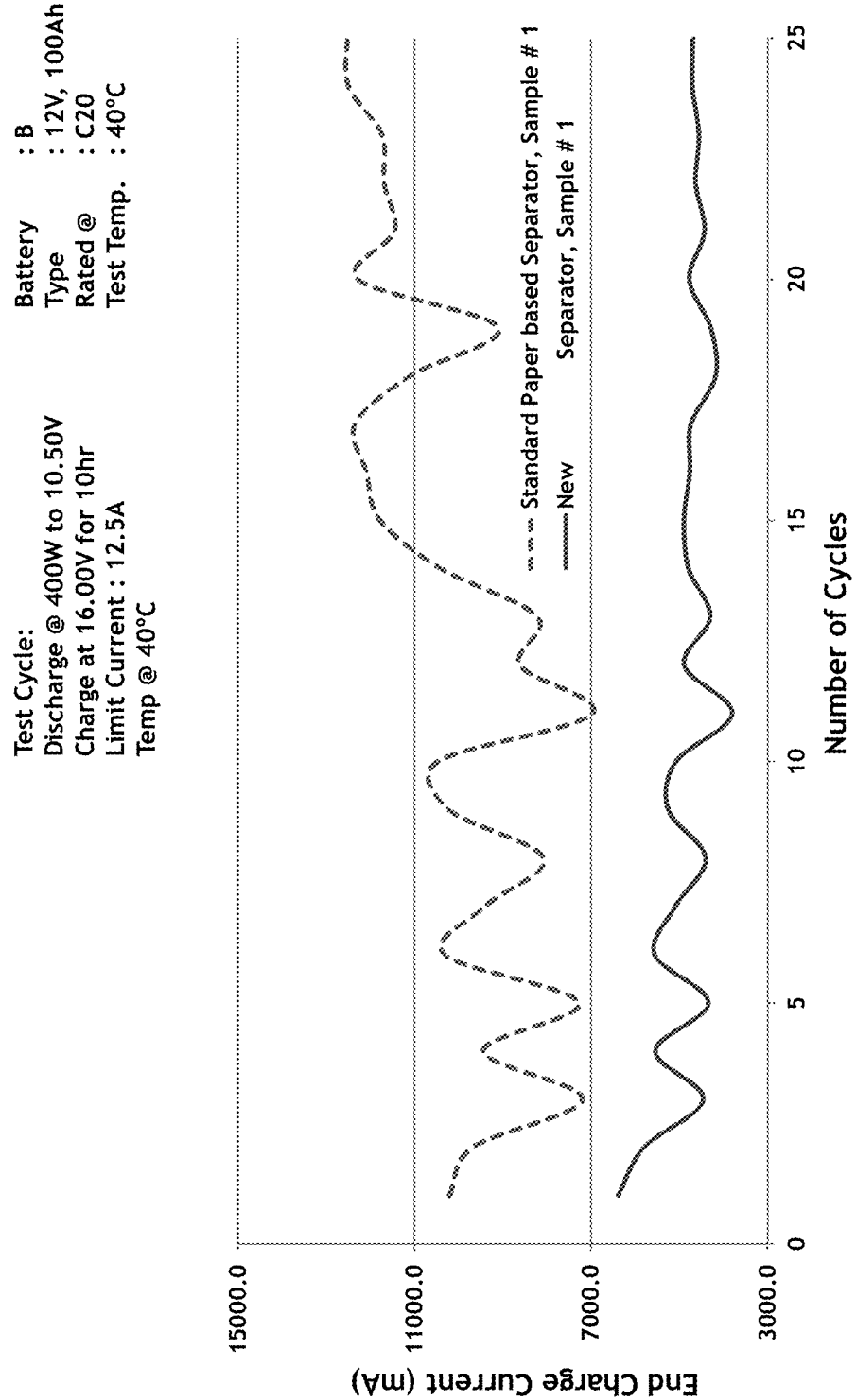
Figure 17:
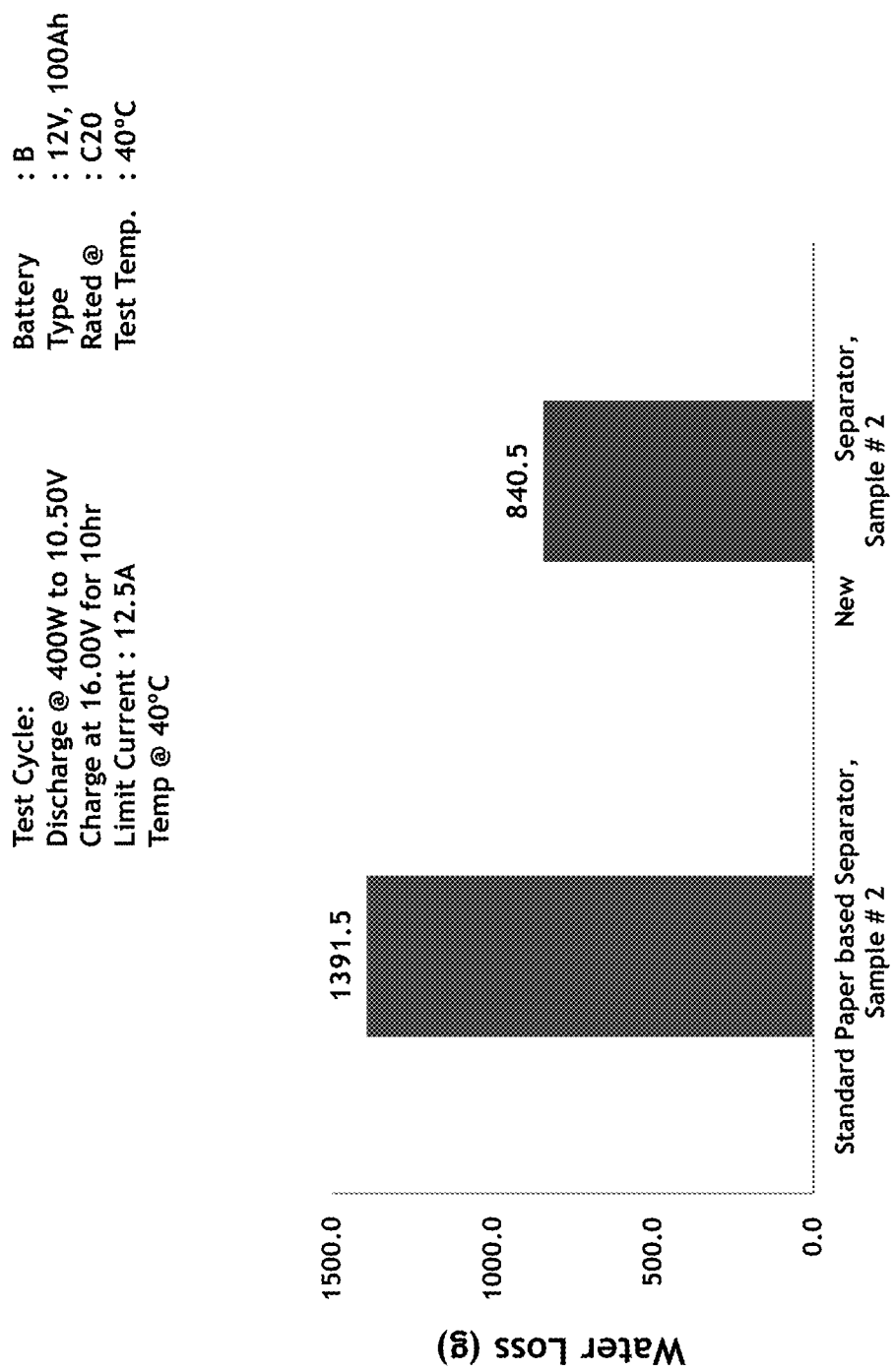
Figure 18:
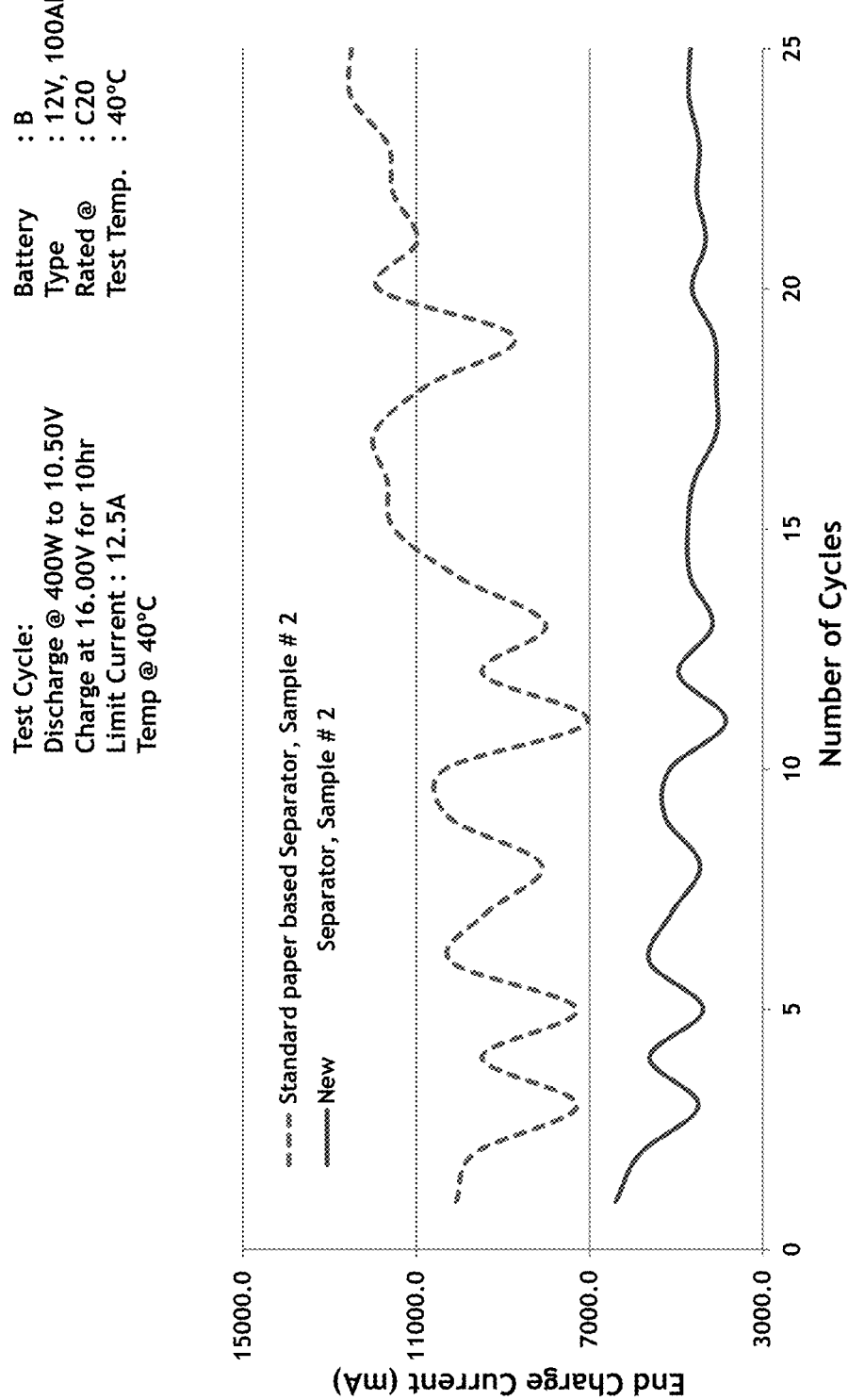

The inventive separator includes a porous membrane (such as a microporous membrane having pores less than about 5 microns, preferably having pores less than about 1 micron, mesoporous membrane, or a macroporous membrane having pores greater than about 5 microns) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The preferred microporous membranes may have average pore size within the range of 0.05 to 0.5 μm, preferably 0.1 to 0.2 μm, and/or pore diameters of about 0.1 micron (100 nanometers), and/or porosities of about 20 to 80%, preferably about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, such as ultrahigh molecular weight polyethylene (UHMWPE), and polypropylene. One preferred embodiment may include a mixture of filler (for example, silica) and UHMWPE.

The porous membrane layer can include a polyolefin, such as polypropylene, ethylene-butene copolymer, and preferably polyethylene, more preferably high molecular weight polyethylene, i.e. polyethylene having a molecular weight of at least 600,000, even more preferably ultra high molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the porous membrane can include an ultrahigh molecular weight polyethylene (UHMWPE) mixed with a processing oil and precipitated silica. In accordance with at least one embodiment, the microporous membrane can include an ultrahigh molecular weight polyethylene (UHMWPE) mixed with a processing oil, additive and precipitated silica. The mixture may also include minor amounts of other additives or agents as is common in the separator arts (such as wetting agents, colorants, antistatic additives, and/or the like). The microporous polymer layer can be a homogeneous mixture of 8 to 100 vol. % of polyolefin, 0 to 40 vol. % of a plasticizer and 0 to 92 vol. % of inert filler material. The filler can be dry, finely divided silica. The preferred plasticizer is petroleum oil. Since the plasticizer is the component which is easiest to remove from the polymer-filler-plasticizer composition, it is useful in imparting porosity to the battery separator. In some embodiments, the porous membrane may be made by mixing, in an extruder, about 30% by weight silica with about 10% by weight UHMWPE, and about 60% processing oil.

The microporous membrane can be made by passing the ingredients through a heated extruder, passing the extrudate generated by the extruder through a die and into the nip formed by two heated calender rolls to form a continuous web, extracting a substantial amount of the processing oil from the web by use of a solvent, drying the extracted web, slitting the web into lanes of predetermined width, and winding the lanes into rolls. The heated calender rolls may be engraved with various groove patterns to impart ribs to the membrane. Alternatively, or additionally, ribs may be imparted to the porous membrane by passing the extruded membrane through additional appropriately grooved embossing rolls, calender rolls or presses.

The microporous polymer layer can have an average pore size of less than 1 μm in diameter. Preferably more than 50% of the pores are 0.5 μm or less in diameter. It is especially preferred that at least 90% of the pores have a diameter of less than 0.5 μm. The microporous polymer layer preferably has an average pore size within the range of 0.05 to 0.5 μm, preferably 0.1 to 0.2 μm.

In some embodiments, the additive includes a surfactant. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive can be represented by a compound of Formula (I)

$$R(OR^1)_n(COOM^{x+}_{1/x})_m \quad (I)$$

in which
R is a non-aromatic hydrocarbon radical with 10 to 4200 carbon atoms, preferably 13 to 4200, which can be interrupted by oxygen atoms,
$R^1$ is H, $-(CH_2)_k COOM^{x+}_{1/x}$ or $-(CH_2)_k-SO_3M^{x+}_{1/x}$, preferably H, where k is 1 or 2,
M is an alkali metal or alkaline-earth metal ion, $H^+$ or $NH_4^+$, where not all the variables M simultaneously have the meaning $H^+$,
n is 0 or 1,
m is 0 or an integer from 10 to 1400 and
x is 1 or 2,
the ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

Surprisingly it was found that through the use of the compounds of Formula (I) for the production of battery separators, they can be effectively protected against oxidative destruction. Battery separators are preferred which contain a compound according to Formula (I) in which
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2-[(OC_2H_4)_p(OC_3H_6)_q]-$, in which
$R^2$ is an alkyl radical with 10 to 30 carbon atoms, preferably 12 to 25, particularly preferably 14 to 20 carbon atoms,
P is an integer from 0 to 30, preferably 0 to 10, particularly preferably 0 to 4 and
q is an integer from 0 to 30, preferably 0 to 10, particularly preferably 0 to 4,
compounds being particularly preferred in which the sum of p and q is 0 to 10, in particular 0 to 4,
n is 1 and
m is 0.

Formula $R^2-[(OC_2H_4)_p(OC_3H_6)_q]-$ is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)CH_2$ and/or $OCH_2CH(CH_3)$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which
R is an alkane radical with 20 to 4200, preferably 50 to 750 and quite particularly preferably 80 to 225 carbon atoms,
M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$,
n is 0,
m is an integer from 10 to 1400 and
x is 1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

The porous membrane can be provided in various ways with the additives, agents, and/or fillers, and/or can be coated with the additives. For example, the additive be applied to the porous membrane when it is finished (i.e. after the extraction) and/or added to the mixture used to produce the membrane. According to a preferred embodiment, the additive or a solution of the additive is applied to the surface of the porous membrane. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the microporous membrane.

The application may also take place by dipping the microporous membrane in the additive or a solution of the additive and subsequently optionally removing the solvent, e.g. by drying. In this way the application of the additive can be combined for example with the oil extraction often applied during separator production.

Another preferred option is to mix the additive or additives into the mixture of thermoplastic polymer and optionally fillers and other additives which is used to produce the porous membrane. The additive-containing homogeneous mixture is then formed into a web-shaped material.

The additive can be present at a density of at least about 0.5 g/m$^2$, 1.0 g/m$^2$, 1.5 g/m$^2$, 2.0 g/m$^2$, 2.5 g/m$^2$, 3.0 g/m$^2$, 3.5 g/m$^2$, 4.0 g/m$^2$, 4.5 g/m$^2$, 5.0 g/m$^2$, 5.5 g/m$^2$, 6.0 g/m$^2$, 6.5 g/m$^2$, 7.0 g/m$^2$, 7.5 g/m$^2$, 8.0 g/m$^2$, 8.5 g/m$^2$, 9.0 g/m$^2$, 9.5 g/m$^2$ or 10.0 g/m$^2$. The additive can be present on the separator at a density between about 0.5-10 g/m$^2$, 1.0-10.0 g/m$^2$, 1.5-10.0 g/m$^2$, 2.0-10.0 g/m$^2$, 2.5-10.0 g/m$^2$, 3.0-10.0 g/m$^2$, 3.5-10.0 g/m$^2$, 4.0-10.0 g/m$^2$, 4.5-10.0 g/m$^2$, 5.0-10.0 g/m$^2$, 5.5-10.0 g/m$^2$, 6.0-10.0 g/m$^2$, 6.5-10.0 g/m$^2$, 7.0-10.0 g/m$^2$, 7.5-10.0 g/m$^2$, 5.0-10.5 g/m$^2$, 5.0-11.0 g/m$^2$, 5.0-12.0 g/m$^2$, or 5.0-15.0 g/m$^2$. The additive can be present on the microporous membrane at a density of about 6.0-10.0 g/m$^2$, 6.5-9.5 g/m$^2$, 6.5-9.0 g/m$^2$, 6.5-8.5 g/m$^2$, 6.5-8.0 g/m$^2$, or 7.0-8.0 g/m$^2$. In some embodiments, the additive is present at a density of about 7.5 g/m$^2$.

In certain selected embodiments, the porous membrane may further contain one or more PIMS material. A PIMS mineral derived from fish bone (such as commercial, lab ground fish meal) has been shown to have greatest affinity for metal ions. The fish bone powder can be extruded via pilot operation into a typical battery separator format at several loading concentrations. In accordance with at least certain embodiments, it is preferred that the fish bone powder be added to substitute for a portion of the silica at substitution levels of about 1% to 20% of the silica, more preferably about 2% to 10%, and most preferably at about 2% to 5%. In accordance with at least other certain embodiments, it is preferred that the ground fish bone powder (ground fish meal) be added to substitute for a portion of the silica at substitution levels of about 1% to 50% or more of the silica, more preferably about 5% to 30%, and most preferably at about 10% to 20%.

In accordance with at least another object of the present invention, there is provided a microporous membrane with ribs. The microporous membrane can have transverse cross-ribs on the opposite face of the membrane as the longitudinal ribs. The cross-rib can be parallel to the longitudinal ribs, or can be disposed at an angle thereto. For instance, the cross ribs can be oriented about 90°, 80°, 75°, 60°, 50°, 45°, 35°, 25°, 15° or 5° relative to the longitudinal ribs. The cross-ribs can be oriented about 90-60°, 60-30°, 60-45°, 45-30°, or 30-0° relative to the longitudinal ribs. Typically the cross ribs are on the face of the membrane facing the negative electrode. In some embodiments of the present invention, the ribbed membrane can have a transverse cross-rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib height of no greater than about 1.0 mm, 0.5 mm, 0.25 mm, 0.20 mm, 0.15 mm, 0.10 mm or 0.05 mm. The ribbed membrane can have a transverse cross-rib height between about 0.005-1.0 mm, 0.01-0.5 mm, 0.025-0.25 mm, 0.05-0.25 mm, 0.075-0.25 mm, 0.075-0.20 mm, 0.075-0.15 mm, 0.10-0.25 mm, 0.1-0.20, 0.10-0.15 mm, or 0.10-0.125 mm.

In some embodiments of the present invention, the ribbed membrane can have a transverse cross-rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. In some embodiments of the present invention, the ribbed membrane can have a transverse cross-rib width of no greater than about 1.0 mm, 0.5 mm, 0.25 mm, 0.20 mm, 0.15 mm, 0.10 mm or 0.05 mm. The ribbed membrane can have a transverse cross-rib width between about 0.005-1.0 mm, 0.01-0.5 mm, 0.025-0.25 mm, 0.05-0.25 mm, 0.075-0.25 mm, 0.075-0.20 mm, 0.075-0.15 mm, 0.10-0.25 mm, 0.1-0.20, 0.10-0.15 mm, or 0.10-0.125 mm. The spacing between the transverse cross-ribs (pitch-to-pitch width) can be from about 0.10-1.0 mm, 0.2-1.0 mm, 0.3-1.0 mm, 0.4-0.9 mm, 0.4-0.8 mm, 0.5-0.8 mm, 0.5-0.7 mm, or 0.6-0.7 mm.

In some embodiments of the present invention, the ribbed membrane can have longitudinal rib height of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm. The ribbed membrane can have a longitudinal rib height between about 0.005-1.5 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.5-1.0 mm, 0.4-0.8 mm or 0.4-0.6 mm. The ribbed membrane can have a longitudinal rib height from about 0.01-0.2 mm, 0.05-0.2 mm, 0.05-0.15 mm, 0.075-0.15 mm, 0.1-0.15 mm, or 0.1 to 0.125 mm.

In some embodiments of the present invention, the ribbed membrane can have longitudinal rib width of at least about 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm. The ribbed membrane can have a longitudinal rib width between about 0.005-1.5 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.5-1.0 mm, 0.4-0.8 mm or 0.4-0.6 mm. The ribbed membrane can have a longitudinal rib width from about 0.01-0.2 mm, 0.05-0.2 mm, 0.05-0.15 mm, 0.075-0.15 mm, 0.1-0.15 mm, or 0.1 to 0.125 mm. The spacing between the longitudinal ribs (pitch-to-pitch width) can be from about 0.10-1.0 mm, 0.2-1.0 mm, 0.3-1.0 mm, 0.4-0.1 mm, 0.5-1.0 mm, 0.5-0.9 mm, 0.6-0.9 mm, 0.6-0.8 mm, or 0.7-0.8 mm.

The longitudinal ribs can be present in a "U" shape, semicircular or rectangular. In some embodiments, the rib height of the longitudinal ribs can be greater than the height of the cross ribs and the rib spacing of the longitudinal ribs can be greater than the spacing of the cross ribs.

In certain selected embodiments the porous membrane can have a transverse cross-rib (negative cross ribs, transverse mini-ribs) height of about 0.10-0.15 mm, and a longitudinal rib height of about 0.1-0.15 mm or greater. In some embodiments, the porous membrane can have a transverse cross-rib height of about 0.10-0.125 mm, a longitudinal rib height of about 0.1-0.125 mm, a transverse cross rib width of about 0.5-0.7 mm and a longitudinal rib width of about 0.6-0.9 mm.

The microporous membrane can have a backweb thickness that is at least 0.1 mm, 0.2 mm, 0.3 mm, 0.4 mm, 0.5 mm 0.6 mm, 0.7 mm, 0.8 mm, 0.9 mm or 1.0 mm. The ribbed separator can have a backweb thickness that is no more than about 1.0 mm, 0.9 mm, 0.8 mm, 0.7 mm, 0.6 mm, 0.5 mm, 0.4 mm, 0.3 mm, 0.2 mm or 0.1 mm. In some embodiments, the microporous membrane can have a backweb thickness between about 0.1-1.0 mm, 0.1-0.8 mm, 0.1-0.5 mm, 0.2-0.5 mm, 0.2-0.4 mm, 0.25-0.35 mm. In some embodiments, the microporous membrane can have a backweb thickness of about 0.3 mm.

In certain selected embodiments the porous membrane can have a transverse cross-rib height of about 0.10-0.15 mm, a longitudinal rib height of about 0.10-0.15 mm, and a backweb thickness of about 0.25-0.35 mm. In some embodiments, the porous membrane can have a transverse cross-rib height of about 0.10-0.125 mm, a longitudinal rib height of about 0.10-0.125 mm, and a backweb thickness of about 0.3 mm.

In some embodiments, the porous membrane can have a total thickness (i.e., rib tip to rib tip) from about 0.2-0.8 mm, 0.3-0.7 mm, or 0.4-0.6 mm. In some embodiments, the total thickness can be about 0.5-0.55 mm.

In some selected embodiments, the separator also contains one of more fibrous layers. In certain embodiments, the side of the microporous membrane facing the positive electrode has a fibrous layer, while in other embodiments, the side of the microporous membrane facing the negative electrode has a fibrous layer. In some preferred embodiments, a fibrous layer is present on both sides of the microporous membrane.

The fibrous layers can be made of glass fibers, polymeric fibers or a mixture of glass fibers and polymeric fibers. Suitable mats made of polymer fibers which may be used as fibrous layers in the present invention are disclosed in U.S. Pat. No. 5,962,161, the disclosure of which is incorporated herein by reference.

The preferred fibrous material is glass. Generally all glass fiber materials known in the art for producing glass mats or absorptive glass mat (AGM) separators may be used for forming the fibrous layers of the present invention. A preferred fibrous material are absorptive microfiber glass fleeces without organic components like binder or polymeric fibers. It is preferred that the fibers have a diameter ranging from 0.1 to 10 µm, more preferably from 0.1 to 5 µm. The fibers are preferably blends of acid resistant glass fibers of various diameter, usually extremely thin fibers with an average fiber diameter below 1 µm, referred to as microfibers, and "coarse" fibers with an average diameter of approx. 3 µm. The microfibers increase the internal surface, improve the tensile strength and decrease the pore diameter but significantly increase the product cost. The larger fibers facilitate the battery filling by creating larger pores with faster acid pick-up, often referred to as wicking rate.

In some embodiments, the fibrous glass layers can comprise 20 to 40% by weight of glass microfibers having an average diameter of less than 1 µm and 60 to 80% by weight of coarse glass fibers having an average diameter of about 3 µm, for instance 30% by weight microfibers and 70% by weight coarse fibers. In certain embodiments, the fibers can have higher diameters, for instance about 5-25 µm, 5-15 µm, 10-15 µm, 10-25 µm, 10-20 µm or 15-20 µm. Blends of such fibers can also be employed, for instance blends of 10-15 µm fibers and 15-20 µm fibers. In some embodiments, fibers having a length of about 0.5-2.0 mm, 0.5-1.5 mm, or 1.0-1.5 mm can be employed. Suitable glass fiber mats and the preparation thereof are well known to a person skilled in the art (see for instance Böhnstedt W., in Handbook of Battery Materials, Editor Besenhard J. O., Wiley-VCH, Weinheim 1999, pages 245 to 292 and literature cited therein).

Preferred fibrous layers made of polymer fibers comprises a nonwoven web, mat or fleece of fibers of a diameter of 0.1 to 10 µm, preferably 0.1 to 5 µm. It is preferred that more than 10% by weight of the fibers, more preferably more than 15% by weight of the fibers and most preferably 20 to 40% by weight of the fibers have a diameter smaller than 1 µm, preferably about 0.1 µm, and it is further preferred that at least 60% by weight of the fibers have diameters of less than 5 µm. The fibers are made of a thermoplastic polymer, which is preferably selected from the group consisting of polyolefins, polystyrenes, polyamides, polyesters, halogenated polymers, and the respective copolymers, more preferably polyolefins and in particular polyethylenes and polypropylenes. To render the fibrous layer wettable, a suitable surface active agent is added to the polymer prior to extrusion or hydrophilic groups are covalently bonded to the surface of the fibers after formation. Suitable treatments are described in U.S. Pat. No. 5,962,161, the disclosure of which is incorporated herein by reference. Nonwoven mats of this type can be manufactured by extrusion and blowing processes. One preferred way is described in U.S. Pat. No. 6,114,017, which comprises melting a polymer by polymer heating and extrusion means, extruding said polymer at flow rates of less than 1 g/min/hole through polymer orifices arranged in one or more spaced apart cross directional rows on one or more modular dies heated by a heating unit, wherein the diameters of said orifices may be equal to each other or may differ from row to row to obtain a web comprising fibers of essentially uniform or varying diameter, blowing said polymer extrudate using heated air of at least 95° C. from two or more constant or variable cross-section air jets per polymer orifice, preferably variable cross-section air jets being converging-diverging nozzles capable of producing supersonic drawing velocities, or tempered air between 10° C. and 375° C. of two or more continuous converging-diverging nozzle slots placed adjacent and essentially parallel to said polymer orifice exits to attenuate said filaments and to produce essentially continuous polymer filaments, and depositing said fiberized polymer on a collecting means to form a self-bonded web consisting of as many layers of disbursed continuous polymer filaments as the number of rows of said polymer orifices in said die. U.S. Pat. No. 5,679,379 discloses modular die units suitable for the production of the above nonwoven mats. The disclosure of both U.S. Pat. Nos. 6,114,017 and 5,679,379 is incorporated herein by reference. The self-bonded webs produced in the above process may also be thermally bonded to provide even greater strength by using conventional hot calendering techniques where the calender rolls may pattern engraved or flat. The nonwoven webs, mats or fleeces have low average diameters, improved uniformity, a narrow range of fiber diameters, and significantly higher unbonded strength than a typical meltblown web. When the material is thermally bonded it is similar in strength to spunbonded nonwovens of the same polymer and basis weight.

When a mixture of glass fibers and polymeric fibers is used, the different fibers are preferably used in such proportions that the sheet has an absorbency with respect to the electrolyte of from 75 to 95% in the absence of a surfactant. Preferably the glass and polymeric fibers defined above are used. Fibrous sheets of this type may be prepared by the methods disclosed in U.S. Pat. No. 4,908,282, the disclosure of which is incorporated herein by reference.

The fibrous layers can be present on the microporous membrane at a thickness of at least about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm or 1.5 mm. In some embodiments, the fibrous layers can be present on the microporous membrane at a thickness from about 0.1-1.5 mm, 0.5-1.5 mm, 0.75-1.5 mm, 0.75-1.25 mm or 1.0-1.25 mm.

In certain selected embodiments the porous membrane can have a transverse cross-rib height of about 0.10-0.15 mm, a longitudinal rib height of about 0.10-0.15 mm, a backweb thickness of about 0.25-0.35 mm, and fibrous layers present on both faces of the membrane having a thickness of about 0.75-1.25 mm. In certain embodiments, it is preferred that the fibrous layer is only on the side of the porous membrane that faces the positive electrode. In some embodiments, the porous membrane can have a transverse cross-rib height of about 0.10-0.125 mm, a longitudinal rib height of about 0.10-0.125 mm, a backweb thickness of about 0.3 mm, and fibrous layers present on both faces of the membrane having a thickness of about 0.75-1.25 mm.

The separators of the present invention can be provided either in sheet form or in the form of an envelope. In some embodiments, a microporous membrane, covered on at least one side with at least one fibrous layer, is provided as a pocket or envelope. In such embodiments, it is preferred that the microporous membrane has a larger surface area than the fibrous layers. Thus, when combining the microporous membrane and the fibrous layers, the fibrous layers do not completely cover the microporous layer. It is preferred that at least two opposing edge regions of the membrane layer remain uncovered to provide edges for heat sealing which facilitates the formation of pockets or envelope. The separators can be processed to form hybrid envelopes. The hybrid envelope can be formed by forming one or more slits or openings before, during or after, folding the separator sheet in half and bonding edges of the separator sheet together so as to form an envelope. The slits are preferably in or near the bottom fold of the pocket or envelope. The sides are bonded together using welds or mechanical seals to form seams that bring one side of the separator sheet into contact with another side of the separator sheet. Welds can be accomplished, for instance, using heat or ultrasonic processes. This process results in an envelope shape having a bottom folded edge and two lateral edges. The fibrous layer can be present on the inner face or the envelope, the outer face or the envelope, or both faces of the envelope.

Separators disclosed herein in the form of an envelope may have one or more slits or openings along the folded or sealed creases of the envelope. The length of the openings can at least $1/50^{th}$, $1/25^{th}$, $1/20^{th}$, $1/15^{th}$, $1/10^{th}$, $1/8^{th}$, $1/5^{th}$, $1/4^{th}$, or $1/3^{rd}$ the length of the entire edge. The length of the openings can be $1/50^{th}$ to $1/3^{rd}$, $1/25^{th}$ to $1/3^{rd}$, $1/20^{th}$ to $1/3^{rd}$, $1/20^{th}$ to $1/4^{th}$, $1/15^{th}$ to $1/4^{th}$, $1/15^{th}$ to $1/5^{th}$ or $1/10^{th}$ to $1/5^{th}$ the length of the entire edge. The hybrid envelope can have 1-5, 1-4, 2-4, 2-3 or 2 openings, which may or may not be equally disposed along the length of the bottom edge. It is preferred that no opening is in the corner of the envelope. The slits may be cut after the separator has been folded and sealed to give an envelope, or the slits may be formed prior to shaping the porous membrane into the envelop.

EXAMPLE 1

Details of Test Battery A

Figure 20:
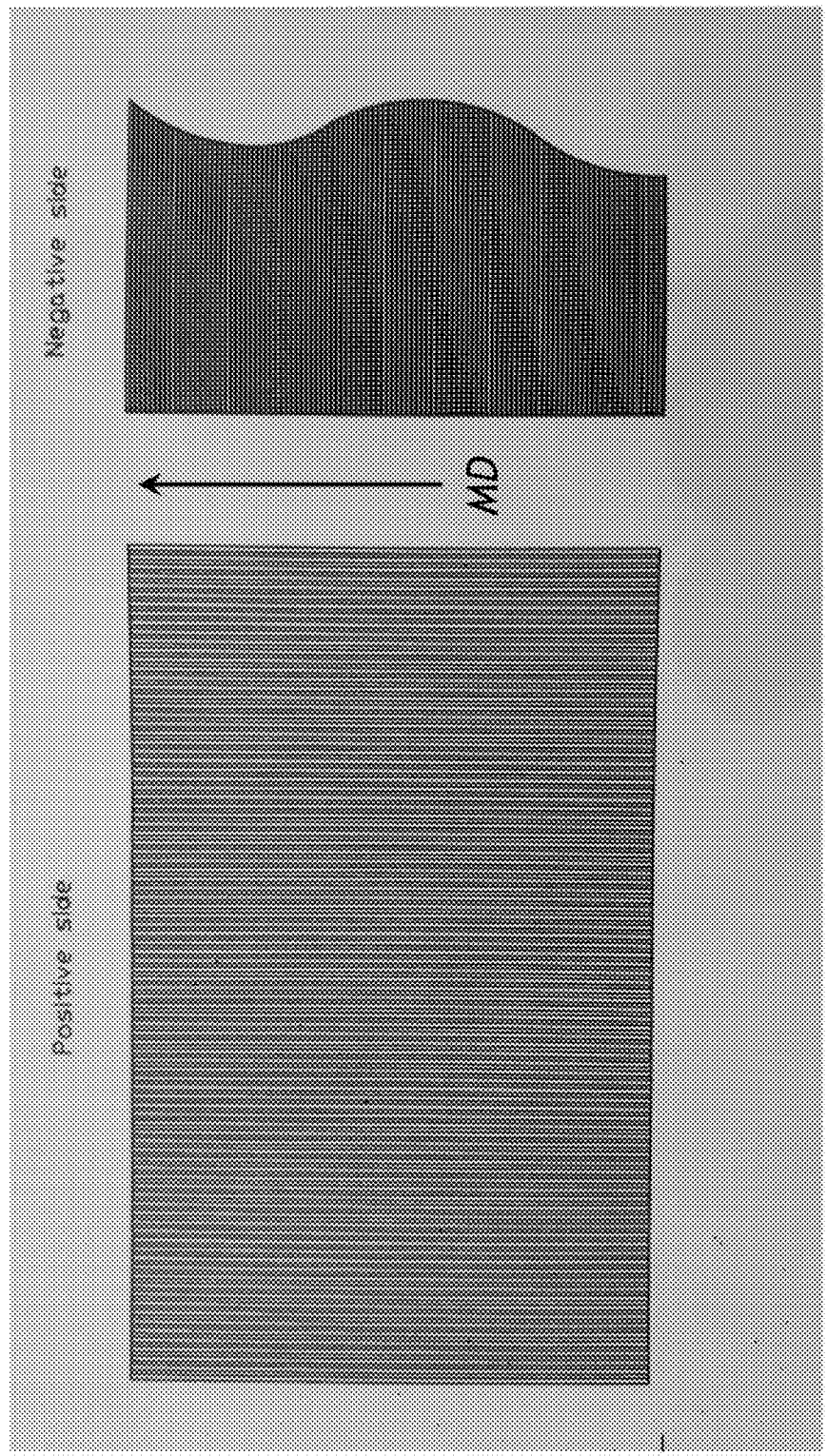
FIG. 20 illustrates an exemplary rib pattern or profile of an exemplary separator of the present invention. As shown, the ribs on the positive side of the separator are generally parallel to the Machine Direction (MD) of the separator, and the ribs on the negative side of the separator are generally orthogonal or perpendicular to the Machine Direction (MD) and possibly preferably smaller and more closely spaced than the positive ribs.

Battery Type: 12V, 100 Ah
Plates per Cell: 15 (7 pos.+8 neg.)
Grid Antimony Content: Selenium alloy grids with 2.5% Sb in the positive grids, and 1.60% Sb in the negative grids
Grid Thickness: 2.2 mm thick positive grids, and 1.7 mm thick negative grids
Plate Thickness: 2.4 mm thick positive plates, and 1.9 mm thick negative plates
Paste Density: 4.20 g/cc on the positive plates, and 4.45 g/cc on the negative plates Details of Separators Standard PE Separator:
Profile: Standard Ribbed
Back Web: 250 µm
Overall Thickness: 1.8 mm (1.0 mm thick PE Separator+0.8 mm thick Glassmat)
Separator Form: Positive plate enveloping
New Separator:
Profile: Special profile with ribs on both sides, longitudinal ribs parallel to the machine direction on the positive side (the side adapted to face the positive plate in the battery) and cross ribs orthogonal to the machine direction on the negative side (the side adapted to face the negative plate in the battery) (see FIG. 20).
Back Web: 300 µm
Overall Thickness: 1.6 mm (0.50 mm thick New Separator+ 1.1 mm thick Glassmat)
Coating Density: 7.5 g/m$^2$
Separator Form: Hybrid envelope, enveloping the negative plate
With reference to FIGS. 11-14, comparison data between batteries equipped with the two separators described above are illustrated. As can be seen, the batteries equipped with the exemplary inventive separator yield less water loss and a lower end of charge current during the first 50 cycles.

EXAMPLE 2

Details of Test Battery B

Battery Type: 12V, 100 Ah
Plates per Cell: 15 (7 pos.+8 neg.)
Grid Antimony Content: Selenium alloy grids with 2.5% Sb in the positive grids, and 1.60% Sb in the negative grids.
Grid Thickness: 2.1 mm thick positive grids, and 1.85 mm thick negative grids
Plate Thickness: 2.3 mm thick positive plates, and 2.05 mm thick negative plates
Paste Density: 4.25 g/cc on the positive plates, and 4.55 g/cc on the negative plates

Details of Separators

Standard Fiber Based Separator:
Profile: Standard Ribbed
Material: Fiber based
Overall Thickness: 1.6 mm (1.0 mm thick PE Separator+0.6 mm thick Glassmat)
Separator Form: Negative plate enveloping
New Separator:
Profile: Special profile with ribs on both sides, longitudinal ribs parallel to the machine direction on the positive side (the side adapted to face the positive plate in the battery) and cross ribs orthogonal to the machine direction on the negative side (the side adapted to face the negative plate in the battery) (see FIG. 20).
Back Web Thickness: 300 μm
Overall Thickness: 1.6 mm (0.50 mm thick New Separator+1.1 mm thick Glassmat)
Coating Density: 7.5 g/m$^2$
Separator Form: Hybrid envelope, enveloping the negative plate With reference to FIGS. 15-18, comparison data between batteries equipped with the two separators described above are illustrated. As can be seen, the batteries equipped with the exemplary inventive separator yield less water loss and a lower end of charge current during the first 25 cycles.

EXAMPLE 3

Details of Test Battery C

Battery Type: 12V, 100 Ah
Plates per Cell: 15 (7 pos.+8 neg.)
Grid Antimony Content: Selenium alloy grids with 1.7% Sb in the positive grids, and 0.11% Ca in the negative grids
Grid Thickness: 2.1 mm thick positive grids, and 1.6 mm thick negative grids
Plate Thickness: 2.3 mm thick positive plates, and 1.8 mm negative plates
Paste Density: 4.20 g/cc on the positive plates, and 4.45 g/cc on the negative plates

Details of Separators

Figure 19:
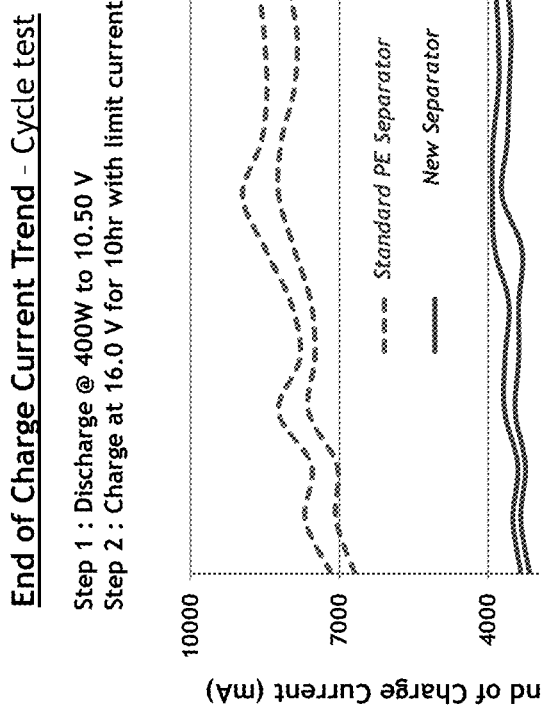
FIG. 19 depicts test results for a third set of exemplary batteries equipped with a control separator and an exemplary separator as described herein. Water loss of an exemplary separator as compared to a control separator during the first 21 days of testing is shown. In addition, the end of charge current of an exemplary separator as compared to a control separator is depicted.
Figure 19:
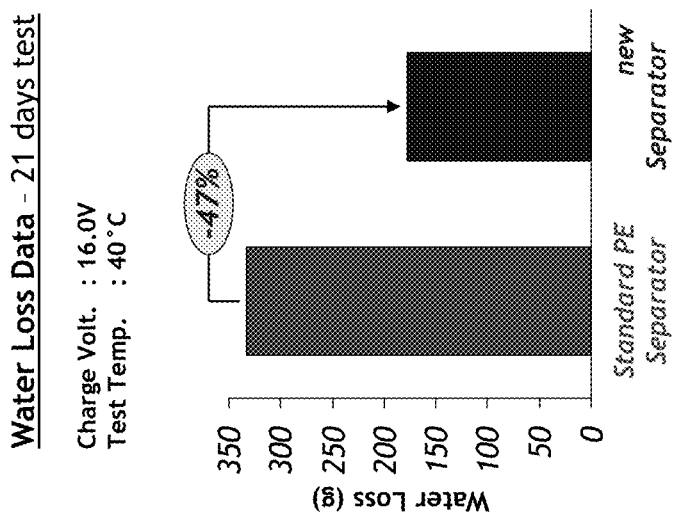

Standard PE Separator:
Profile: No ribs on the pos. side, mini ribs on the negative side.
Back Web: 250 μm
Overall Thickness: 1.4 mm (0.40 mm thick PE Separator+1.0 mm thick Glassmat)
Separator Form: Negative plate enveloping
New Separator:
Profile: Special profile with ribs on both sides, longitudinal ribs parallel to the machine direction on the positive side (the side adapted to face the positive plate in the battery) and cross ribs orthogonal to the machine direction on the negative side (the side adapted to face the negative plate in the battery) (see FIG. 20).
Back web: 300 μm
Overall Thickness: 1.5 mm (0.50 mm thick New Separator+1.0 mm thick Glassmat)
Coating Density: 7.5 g/m$^2$
Separator Form: Hybrid envelope, enveloping the negative plate With reference to FIG. 19, comparison data between batteries equipped with the two separators described above are illustrated. As can be seen, the batteries equipped with the exemplary inventive separator yield less water loss and a lower end of charge current.

On average, batteries equipped with an exemplary inventive separator as described herein yield approximately 47% less water loss as compared to batteries tested with standard control separators. This reduction in water loss, in addition to a lower end of charge current, helps reduce positive grid corrosion and has been observed to yield approximately 25% less grid corrosion.

The relatively small overall thickness of the exemplary separators allow for a relatively thicker glass mat. In addition, the negative cross ribs on the negative side of the separator help to reduce stratification and therefore support rechargeability.

Besides lowering water loss and leading to extended battery life, preferred separators are also designed to bring other benefits. With regard to assembly, the separators have the negative cross rib design to maximize bending stiffness and ensure highest manufacturing productivity. To prevent shorts during high speed assembly and later in life, the separators have superior puncture and oxidation resistance when compared to standard PE separators.

Disclosed herein are novel or improved separators, battery separators, lead battery separators, batteries, cells, and/or methods of manufacture and/or use of such separators, battery separators, lead battery separators, cells, and/or batteries. In accordance with at least certain embodiments, aspects or objects, the present disclosure or invention is directed to novel or improved battery separators for lead acid batteries. In addition, disclosed herein are methods, systems and battery separators for enhancing battery life, reducing active material shedding, reducing grid and spine corrosion, reducing failure rate reducing acid stratification and/or improving uniformity in at least lead acid batteries, in particular batteries for electric rickshaws. In accordance with at least particular embodiments, the present disclosure or invention is directed to an improved separator for lead acid batteries wherein the separator includes improved membrane profiles, improved coatings, improved configurations, and/or the like.

In accordance with at least certain embodiments, aspects or objects, the present disclosure or invention is directed to or provides an improved separator for use in a battery for an electric rickshaw comprising:
a porous membrane comprising
an additive at a density from about 4.0-10.0 g/m$^2$;
cross ribs having a height from about 0.075-0.15 mm;

longitudinal ribs having a height from about 0.075-0.15 mm;
a backweb thickness of about 0.20-0.35 mm; and optionally
a fibrous layer on at least one face of the porous membrane, the separator having a total thickness of about 0.425-3.0 mm, the separator or membrane being a piece, sleeve, wrap, pocket, or envelope, and/or the separator or membrane having one or more slits or openings.

The above separator, wherein the porous membrane is a microporous membrane, wherein the membrane comprises polyethylene, wherein the membrane comprises ultrahigh molecular weight polyethylene, wherein the additive is a surfactant, wherein the additive is a non-ionic surfactant, wherein the additive is present at a density of about 7.5 g/m$^2$, wherein the cross ribs have a rib height of about 0.075-0.125 mm, wherein the longitudinal ribs have a rib height of about 0.075-0.125 mm, wherein the fibrous layer comprises glass fibers, wherein the fibrous layer is present on both sides of the porous membrane, wherein the fibrous layer is from about 0.75-1.25 mm thick, wherein the porous membrane is in the shape of an envelope or pocket, wherein the envelope comprises at least one slit, wherein the separator having a total thickness of about 1.5-2.7 mm, wherein the backweb thickness is about 0.30 mm, wherein the additive is a surfactant coating, wherein the additive is a component of the polymer mixture, or combinations thereof.

An improved separator for use in a battery adapted for an electric rickshaw comprising:
a porous membrane comprising
cross ribs having a height from about 0.075-0.15 mm;
longitudinal ribs having a height from about 0.075-0.15 mm; and
a backweb thickness of about 0.20-0.35 mm; and
an additive at a density from about 4.0-10.0 g/m$^2$; and
optionally a fibrous layer on at least one face of the porous membrane, the separator having a total thickness of about 0.425-3.0 mm, the separator or membrane being a piece, sleeve, wrap, pocket, or envelope, and/or the separator or membrane having one or more slits or openings.

A lead acid battery characterized by at least one of the following:
reduced active material shedding;
reduced grid and spine corrosion;
reduced failure rate;
wherein the battery comprises the above separator.

An improved electric rickshaw, comprising at least one of the above batteries.

A method of reducing failure in a lead acid battery for an electric rickshaw, wherein the method comprises providing the above separator.

Novel or improved separators, battery separators, lead battery separators, batteries, cells, and/or methods of manufacture and/or use of such separators, battery separators, lead battery separators, cells, and/or batteries; novel or improved battery separators for lead acid batteries; novel or improved lead acid batteries; novel or improved e-rickshaws; methods, systems and battery separators for enhancing battery life, reducing active material shedding, reducing grid and spine corrosion, reducing failure rate reducing acid stratification and/or improving uniformity in at least lead acid batteries, in particular batteries for electric rickshaws; improved separator for lead acid batteries wherein the separator includes improved membrane profiles, improved coatings, improved configurations, and/or the like; and/or combinations thereof as shown or described herein.

The present invention may be embodied in other forms without departing from the spirit and the essential attributes thereof, and, accordingly, reference should be made to the appended claims, rather than to the foregoing specification, as indicating the scope of the invention.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. "Such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A separator for use in a battery for an electric rickshaw comprising:
    a porous membrane comprising polyolefin, filler, and a plasticizer; from about 4.0-10.0 g/m² of one or more additives selected from the group consisting of polysaccharides, organosilicone based surfactants, quarternary amines, polyethoxylated alcohol, ethylene vinyl acetate terpolymers, ethoxylated alkyl aryl phosphate esters, and sucrose esters of fatty acid; cross ribs having a height from about 0.075-0.15 mm;
    longitudinal ribs having a height from about 0.075-0.15 mm; and a back-web thickness of 0.20-0.35 mm; and
    a fibrous layer on at least one face of the porous membrane, the fibrous layer is from about 0.75-1.25 mm thick,
    the separator having a total thickness of about 0.425-3.0 mm, the separator or membrane being an envelope having one or more slits along and parallel to a bottom fold of the envelope.

2. The separator according to claim 1, wherein the porous membrane is a microporous membrane.

3. The separator according to claim 1, wherein the membrane comprises polyethylene.

4. The separator according to claim 3, wherein the membrane comprises ultrahigh molecular weight polyethylene.

5. The separator according to claim 1, wherein the additive is present at a density of about 7.5 g/m².

6. The separator according to claim 1, wherein the cross ribs have a rib height of about 0.075-0.125 mm.

7. The separator according to claim 1, wherein the longitudinal ribs have a rib height of about 0.075-0.125 mm.

8. The separator according to claim 1, wherein the fibrous layer comprises glass fibers.

9. The separator according to claim 1, wherein the fibrous layer is present on both sides of the porous membrane.

10. The separator according to claim 1, wherein the porous membrane is in the shape of an envelope or pocket.

11. The separator according to claim 10, wherein the envelope comprises at least one slit.

12. The separator according to claim 1, wherein the separator having a total thickness of about 1.5-2.7 mm.

13. The separator according to claim 1, wherein the back-web thickness is about 0.30 mm.

14. The separator according to claim 1, wherein the porous membrane comprises a thermoplastic polymer and an additive selected from the group consisting of residual oils and fillers.

15. A lead acid battery characterized by at least one of the following:
    reduced active material shedding;
    reduced grid and spine corrosion; and
    reduced failure rate;
    and wherein the battery comprises the separator of claim 1.

16. An improved electric rickshaw, comprising at least one battery of claim 15.

17. A method of reducing failure in a lead acid battery for an electric rickshaw, wherein the method comprises:
    providing a lead acid battery for an electric rickshaw into an electric rickshaw; and
    utilizing a separator according to claim 1 in the lead acid battery.

18. A method for preparing a battery, comprising providing the separator of claim 1.

19. The separator of claim 1, wherein the plasticizer is a petroleum oil.

* * * * *